US 10,817,772 B2

(12) United States Patent
Oneda et al.

(10) Patent No.: US 10,817,772 B2
(45) Date of Patent: Oct. 27, 2020

(54) IDENTITY DETERMINATION APPARATUS AND IDENTITY DETERMINATION SYSTEM

(71) Applicant: FUJI XEROX CO., LTD., Tokyo (JP)

(72) Inventors: Yuichi Oneda, Kanagawa (JP); Tatsuya Yamamoto, Kanagawa (JP); Tetsuya Kimura, Kanagawa (JP); Kenichiro Fukuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/153,843

(22) Filed: Oct. 8, 2018

(65) Prior Publication Data
US 2019/0347535 A1 Nov. 14, 2019

(30) Foreign Application Priority Data
May 14, 2018 (JP) .................................. 2018-092729

(51) Int. Cl.
*G06K 19/00* (2006.01)
*G06K 19/10* (2006.01)
(Continued)

(52) U.S. Cl.
CPC ....... *G06K 19/10* (2013.01); *G06K 19/06037* (2013.01); *G06K 19/06046* (2013.01); *G06K 19/086* (2013.01)

(58) Field of Classification Search
CPC . G07D 7/20; G07D 11/20; G07D 7/12; G07D 7/00; G07D 11/30; G07F 19/20;
(Continued)

(56) References Cited

U.S. PATENT DOCUMENTS 8,077,961 B2* 12/2011 Schmalz ................. G07D 7/20
382/135
8,371,429 B2* 2/2013 Hamasaki ............... G07F 19/20
194/207

(Continued)

FOREIGN PATENT DOCUMENTS

JP 2005316527 11/2005
JP 2010050551 3/2010
JP 5945600 7/2016

*Primary Examiner* — Daniel A Hess
(74) *Attorney, Agent, or Firm* — JCIPRNET

(57) ABSTRACT

An identity determination apparatus includes a first storage unit that stores registration apparatus information used in a case where reference data obtained by imaging a portion of a surface of an object to be determined is registered, material information regarding the object which is a target for identity determination, collation apparatus information used in a case where collation data is acquired, and collation reference information used in collation in association with each other, a second storage unit that stores the registration apparatus information and the material information in association with reference data acquired in advance, a reception unit that receives collation data acquired from the object to be determined in a case where a determination process is performed, the material information, and the collation apparatus information, and a determination unit that reads out the collation reference information corresponding to the material information and the collation apparatus information which are received by the reception unit and the registration apparatus information to be specified by the collation apparatus information from the first storage unit, reads out the reference data corresponding to the registration apparatus information to be specified by the collation apparatus information, and the material information from the second storage unit, and collates the collation data received by the reception unit and the reference data read out from the second storage unit with each other using the read-out collation reference information to determine identity of the object to be determined.

14 Claims, 23 Drawing Sheets

(51) Int. Cl.
*G06K 19/06* (2006.01)
*G06K 19/08* (2006.01)

(58) Field of Classification Search
CPC ........ B65H 3/0638; G06K 9/00; G06K 19/10; G06K 19/06037; G06K 19/06046; G06K 19/086; D07D 11/30
USPC .................................. 235/379, 380; 382/135
See application file for complete search history.

(56) References Cited

U.S. PATENT DOCUMENTS

| | | | | |
|---|---|---|---|---|
| 2004/0232218 | A1* | 11/2004 | Graham | G07D 7/00 235/379 |
| 2008/0283451 | A1* | 11/2008 | Holl | G07D 11/20 209/534 |
| 2009/0242627 | A1* | 10/2009 | Reinisch | G07D 11/30 235/379 |
| 2009/0278307 | A1* | 11/2009 | Skinner | B65H 3/0638 271/273 |
| 2010/0195894 | A1* | 8/2010 | Lohweg | G07D 7/2016 382/135 |
| 2010/0202680 | A1* | 8/2010 | Hamasaki | G06K 9/00 382/137 |
| 2014/0166432 | A1* | 6/2014 | Saiki | G07D 7/00 194/206 |
| 2014/0216888 | A1* | 8/2014 | Horigome | G07F 19/20 194/206 |
| 2015/0262008 | A1* | 9/2015 | Stewart | G07D 7/12 382/135 |

* cited by examiner

FIG. 4

EXAMPLE OF DETERMINATION SET TABLE

| REGISTRATION DEVICE INFORMATION | MATERIAL INFORMATION | COLLATION DEVICE INFORMATION | COLLATION PARAMETER | |
|---|---|---|---|---|
| | | | THRESHOLD VALUE OF CORRELATION COEFFICIENT | THRESHOLD VALUE OF NORMALIZED SCORE |
| scan001 | PLAIN PAPER | phone001 | 0.34 | 8 |
| scan001 | PLAIN PAPER | phone002 | 0.5 | 12 |
| scan001 | CARDBOARD | phone001 | 0.41 | 10 |
| scan002 | PLAIN PAPER | phone001 | 0.29 | 9 |

FIG. 5

EXAMPLE OF RANDOM PATTERN TABLE

| REGISTRATION DEVICE INFORMATION | MATERIAL INFORMATION | REFERENCE DATA (RANDOM PATTERN) |
|---|---|---|
| scan001 | PLAIN PAPER | 0x83a53159···· |
| scan001 | PLAIN PAPER | 0x3329b5f0···· |
| scan001 | CARDBOARD | 0x1003ca67···· |
| scan002 | PLAIN PAPER | 0x33f04961···· |

PROCESSING IN CASE WHERE REFERENCE DATA IS REGISTERED

FIG. 17

SECOND EXEMPLARY EMBODIMENT
EXAMPLE OF RANDOM PATTERN TABLE

| REGISTRATION DEVICE INFORMATION | MATERIAL INFORMATION | IDENTIFICATION ID | REFERENCE DATA (RANDOM PATTERN) |
|---|---|---|---|
| scan001 | PLAIN PAPER | ID10012 | 0x83a53159···· |
| scan001 | PLAIN PAPER | ID10003 | 0x3329b5f0···· |
| scan001 | CARDBOARD | ID10055 | 0x1003ca67···· |
| scan002 | PLAIN PAPER | ID10102 | 0x33f04961···· |

FIG. 21

THIRD EXEMPLARY EMBODIMENT
EXAMPLE OF COLLATION HISTORY INFORMATION

| REGISTRATION DEVICE INFORMATION | MATERIAL INFORMATION | COLLATION DEVICE INFORMATION | COLLATION DATA (RANDOM PATTERN) |
|---|---|---|---|
| scan001 | PLAIN PAPER | phone001 | 0x83a53159···· |
| scan001 | PLAIN PAPER | phone002 | 0x3329b5f0···· |
| scan001 | CARDBOARD | phone001 | 0x1003ca67···· |
| scan002 | PLAIN PAPER | phone001 | 0x33f04961···· |

FIG. 22

THIRD EXEMPLARY EMBODIMENT
EXAMPLE OF CALCULATION OF LUMINANCE AVERAGE VALUE AND
LUMINANCE VARIANCE OF COLLATION RANDOM PATTERN

| REGISTRATION DEVICE INFORMATION | MATERIAL INFORMATION | COLLATION DEVICE INFORMATION | LUMINANCE AVERAGE VALUE | LUMINANCE VARIANCE |
|---|---|---|---|---|
| scan001 | PLAIN PAPER | phone001 | 15.1 | 8 |
| scan001 | PLAIN PAPER | phone002 | 14.9 | 3 |
| scan001 | CARDBOARD | phone001 | 11.5 | 4.5 |
| scan002 | PLAIN PAPER | phone001 | 13.4 | 6.8 |

FIG. 23

THIRD EXEMPLARY EMBODIMENT
EXAMPLE OF CALCULATION OF LUMINANCE AVERAGE VALUE AND
LUMINANCE VARIANCE OF REFERENCE RANDOM PATTERN

| REGISTRATION DEVICE INFORMATION | MATERIAL INFORMATION | LUMINANCE AVERAGE VALUE | LUMINANCE VARIANCE |
|---|---|---|---|
| scan001 | PLAIN PAPER | 15.1 | 8 |
| scan001 | CARDBOARD | 8.5 | 3 |
| scan002 | PLAIN PAPER | 9.0 | 2.9 |
| scan002 | RESIN | 25.1 | 11.1 |

IDENTITY DETERMINATION APPARATUS AND IDENTITY DETERMINATION SYSTEM

CROSS-REFERENCE TO RELATED APPLICATIONS

This application is based on and claims priority under 35 USC 119 from Japanese Patent Application No. 2018-092729 filed May 14, 2018.

BACKGROUND

(i) Technical Field

The present invention relates to an identity determination apparatus and an identity determination system.

(ii) Related Art

JP2005-316527A discloses a securities authenticity determination system that reads image information of securities to discriminate the type of securities from the read image information, specifies a position where a securities number is displayed on the basis of the discriminated type of securities to read the securities number and read characteristic information for determining the authenticity of securities, and determines the authenticity of the securities from the read securities number and characteristic information.

JP2010-050551A discloses an image forming apparatus that detects the glossiness of a document disposed on a document table and irradiates the document with light with the amount of light corresponding to the detected glossiness to take a paper fingerprint.

JP5945600B discloses an IC card authenticity determination system that acquires a random pattern peculiar to a card from the surface of an IC card and compares the acquired random pattern with comparison collation information stored in the IC card to perform IC card authenticity determination.

SUMMARY

Aspects of non-limiting embodiments of the present disclosure relate to an identity determination apparatus and an identity determination system which are capable of improving the accuracy of collation in a case of determining the identity of an object by registering an image obtained by imaging a portion of the surface of the object as reference data and comparing collation data acquired from an object to be determined with the reference data, as compared to a case where the same collation process is performed regardless of a registration apparatus, a collation apparatus, and a material of an object.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an identity determination apparatus includes a first storage unit that stores registration apparatus information used in a case where reference data obtained by imaging a portion of a surface of an object to be determined is registered, material information regarding the object which is a target for identity determination, collation apparatus information used in a case where collation data is acquired, and collation reference information used in collation in association with each other, a second storage unit that stores the registration apparatus information and the material information in association with reference data acquired in advance, a reception unit that receives collation data acquired from the object to be determined in a case where a determination process is performed, the material information, and the collation apparatus information, and a determination unit that reads out the collation reference information corresponding to the material information and the collation apparatus information which are received by the reception unit and the registration apparatus information to be specified by the collation apparatus information from the first storage unit, reads out the reference data corresponding to the registration apparatus information to be specified by the collation apparatus information, and the material information from the second storage unit, and collates the collation data received by the reception unit and the reference data read out from the second storage unit with each other using the read-out collation reference information to determine identity of the object to be determined.

BRIEF DESCRIPTION OF THE DRAWINGS

Exemplary embodiment(s) of the present invention will be described in detail based on the following figures, wherein:

FIG. 4 is a diagram illustrating an example of a determination set table stored in a determination set table storage unit 35;

FIG. 5 is a diagram illustrating an example of a random pattern table stored in a random pattern table storage unit 34;

FIG. 17 is a diagram illustrating an example of a random pattern table in a second exemplary embodiment of the present invention;

FIG. 21 is a diagram illustrating an example of collation history information stored in a collation history information storage unit 36 in the third exemplary embodiment of the present invention;

FIG. 22 is a diagram illustrating an example of calculation of a luminance average value and a luminance variance of collation data in the third exemplary embodiment of the present invention; and FIG. 23 is a diagram illustrating an example of calculation of a luminance average value and a luminance variance of reference data in the third exemplary embodiment of the present invention.

DETAILED DESCRIPTION

Next, an exemplary embodiment of the present invention will be described in detail with reference to the accompanying drawings.

Here, a technique for determining identity called a paper fingerprint will be described before an identity determination system according to the exemplary embodiment is described.

There is a unique random pattern such as a human fingerprint, a vein pattern, or an iris pattern on surfaces of various objects such as paper, a metal, and a resin. For this reason, an image of a portion of a random pattern distributed along the surface of an object is acquired and registered as reference data, a random pattern imaged from the same location of the object is acquired again as collation data, and the collation data is compared with the reference data registered in advance, so that it is possible to determine whether or not the objects are the identical object, that is, the authenticity of the object. That is, in a case where the registered reference data and the collation data acquired from the object to be determined are sufficiently similar to each other, it can be determined that the object is identical to the object from which the reference data is acquired, or it can be determined that the objects are different objects.

In particular, paper is made by intricately intertwining vegetable fibers, and it is possible to acquire a random pattern by capturing an image of a portion of the paper.

Using random patterns of vegetable fibers included in pieces of paper, or the like as "fingerprints" for identifying the respective pieces of paper is referred to as a Paper Finger Print (PFP) technique. Meanwhile, the PFP technique can also be applied not only to paper but also to objects having random patterns on the surfaces of the objects such as a blasted metal plate or a silver-coated resin plate.

It is possible to perform authenticity determination of, for example, various tickets, securities, or certificates by using the identity determination technique.

First Exemplary Embodiment

Figure 1:
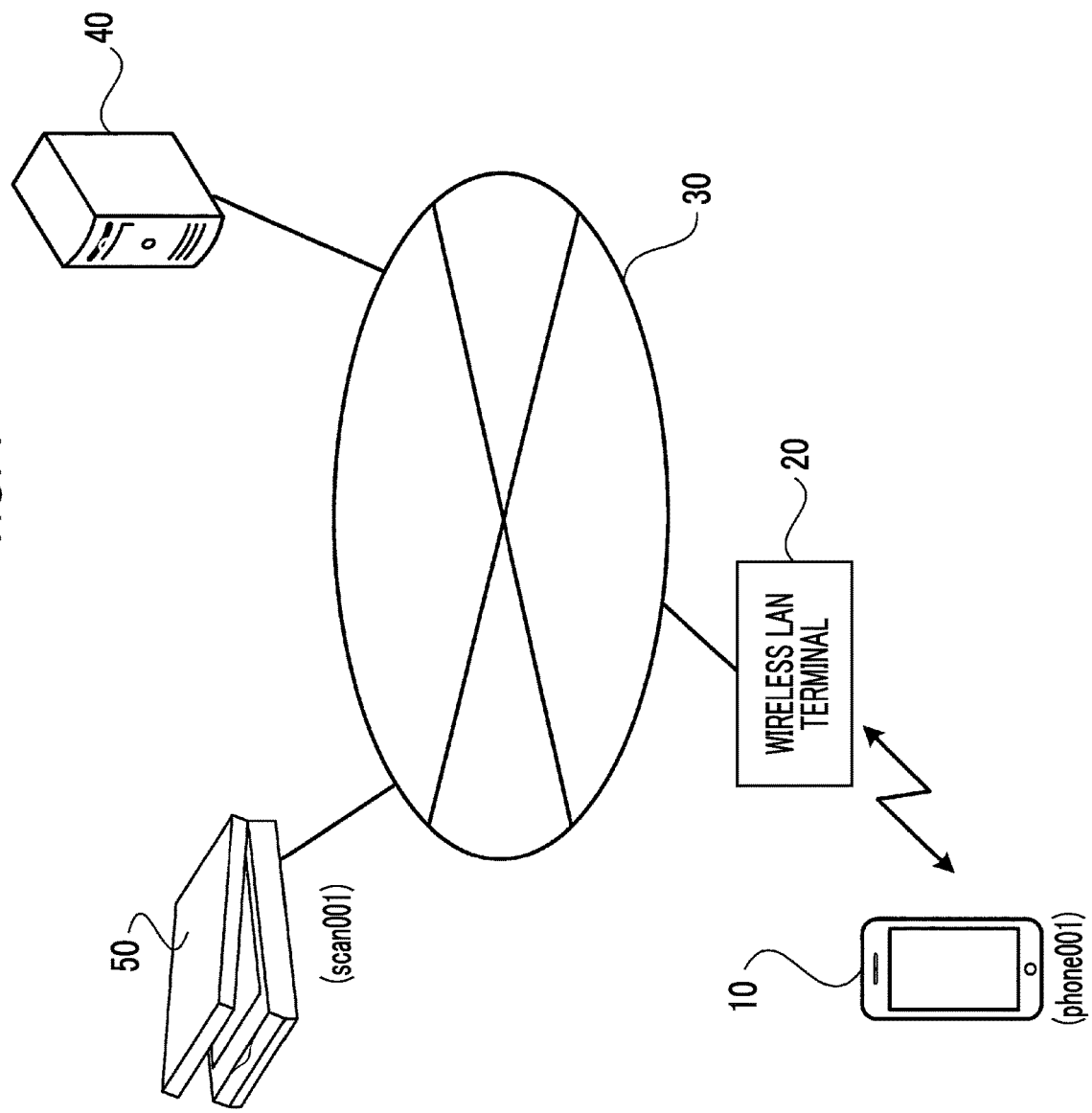
FIG. 1 is a diagram illustrating a system configuration of an identity determination system according to a first exemplary embodiment of the present invention.

A system configuration of the identity determination system according to the first exemplary embodiment of the present invention which performs identity determination is illustrated in FIG. 1.

As illustrated in FIG. 1, the identity determination system according to the exemplary embodiment includes a terminal apparatus 10, a determination server 40, and a scanning apparatus 50 connected to each other through a network 30.

In the identity determination system according to the exemplary embodiment, the identity of an object is determined by registering an image obtained by imaging a portion of the surface of an object as reference data and comparing collation data acquired from an object to be determined with the reference data.

In the identity determination system according to the exemplary embodiment, a random pattern of a specific region on the surface of the object to be determined is registered in the determination server 40 as reference data by the scanning apparatus 50.

An object to be determined for which identity is to be determined is imaged by the terminal apparatus 10 such as a smartphone, a random pattern of a specific region on the surface of the object is acquired as collation data, and the random pattern is transmitted to the determination server 40 through a wireless LAN terminal 20 by the network 30.

The determination server 40 compares the collation data transmitted from the terminal apparatus 10 with reference data registered in advance to determine whether or not the object to be determined is identical to an object in a case where the reference data is acquired, and notifies the terminal apparatus 10 of a result of the determination.

The terminal apparatus 10 displays the determination result in the determination server 40, so that a user can know the identity, that is, the authenticity of the object to be determined.

Meanwhile, in FIG. 1, only one terminal apparatus 10 and only one scanning apparatus 50 are illustrated, but actually, there are various types of apparatuses for the terminal apparatus 10 imaging collation data and the scanning apparatus 50 acquiring reference data.

Figure 2:
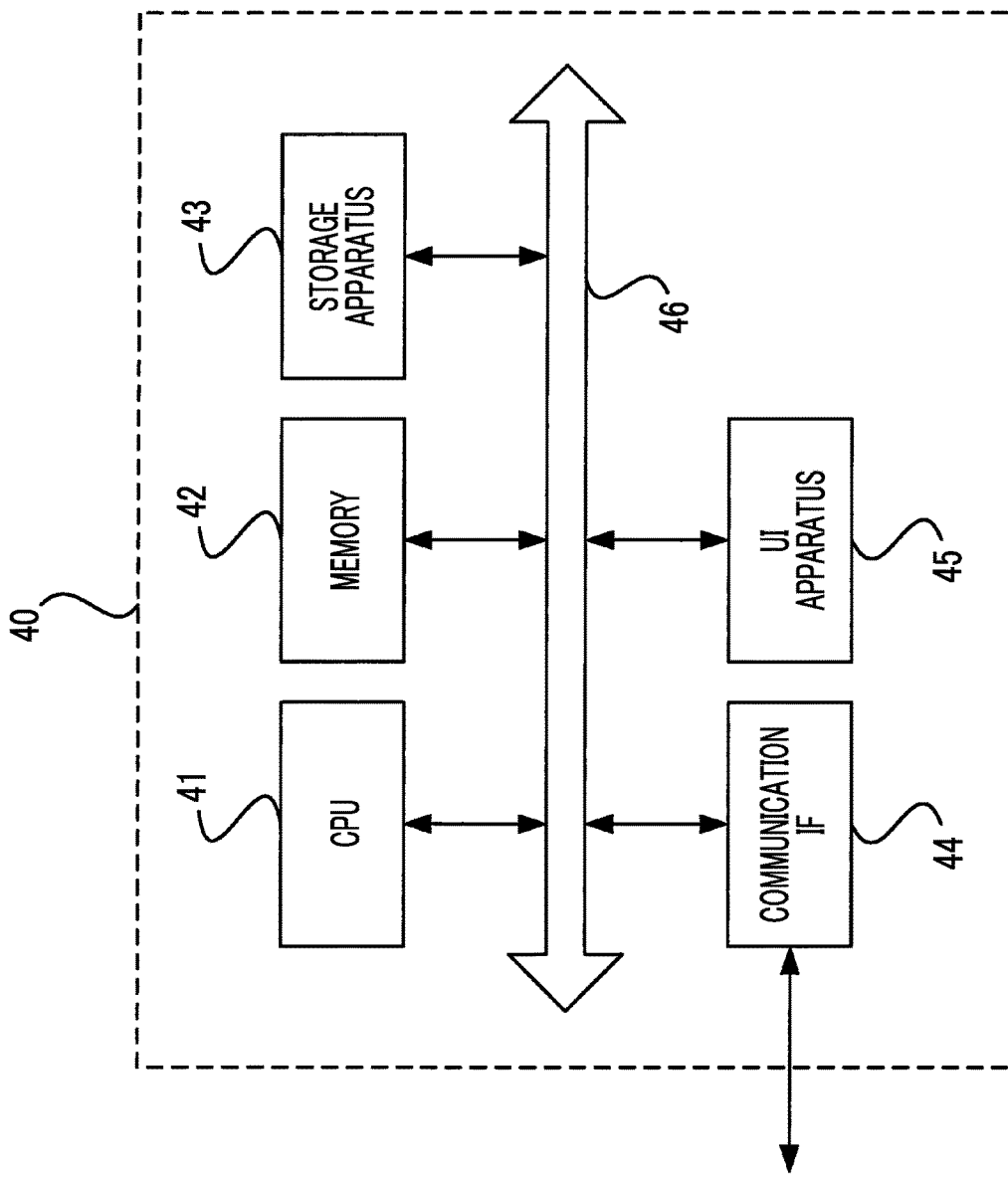
FIG. 2 is a block diagram illustrating a hardware configuration of a determination server 40 in the first exemplary embodiment of the present invention.

Next, a hardware configuration of the determination server 40 in the identity determination system according to the exemplary embodiment is illustrated in FIG. 2.

As illustrated in FIG. 2, the determination server 40 includes a CPU 41, a memory 42, a storage apparatus 43 such as a hard disk drive (HDD), a communication interface (IF) 44 transmitting and receiving data to and from an external apparatus through the network 30, and a user interface (UI) apparatus 45 including a touch panel or a liquid crystal display and a keyboard. These components are connected to each other through a control bus 46.

The CPU 41 executes predetermined processing on the basis of a control program stored in the memory 42 or the storage apparatus 43 to control the operation of the determination server 40. Meanwhile, in the exemplary embodiment, a description has been given on the assumption that the CPU 41 reads out and executes the control program stored in the memory 42 or the storage apparatus 43, but the program can also be stored in a storage medium such as a CD-ROM and provided to the CPU 41.

Figure 3:
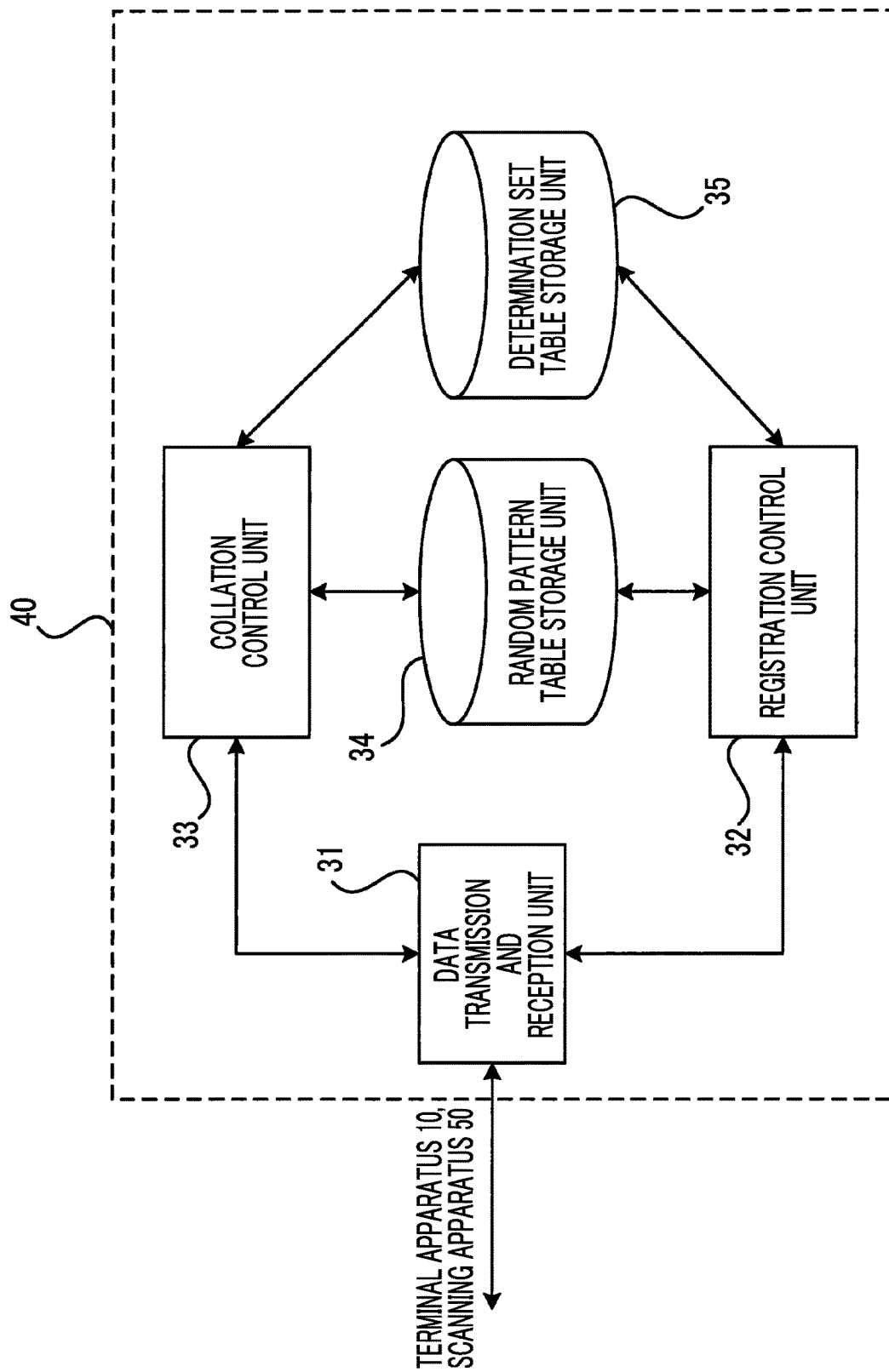
FIG. 3 is a block diagram illustrating a functional configuration of the determination server 40 in the first exemplary embodiment of the present invention.

FIG. 3 is a block diagram illustrating a functional configuration of the determination server 40 which is realized by executing the above-described control program.

As illustrated in FIG. 3, the determination server 40 according to the exemplary embodiment includes a data transmission and reception unit 31, a registration control unit 32, a collation control unit 33, a random pattern table storage unit 34, and a determination set table storage unit 35.

The determination set table storage unit 35 stores a determination set table in which registration device information (registration apparatus information) used in a case where reference data obtained by imaging a portion of the surface of an object to be determined is registered, material information (material information) regarding an object which is a target for identity determination, collation device information (collation apparatus information) used in a case where collation data is acquired, and collation parameters (collation reference information) used for collation are associated with each other.

An example of the determination set table stored in the determination set table storage unit 35 is illustrated in FIG. 4.

In the determination set table illustrated in FIG. 4, an example is illustrated in which information regarding the scanning apparatus 50 used in a case of registering reference data, for example, information "scan001" such as an apparatus type name is associated as registration device information, "plain paper" which is a material of an object to be determined is associated as material information, and information regarding the terminal apparatus 10 used in a case where collation data is acquired, for example, information "phone001" such as an apparatus type name is associated as collation device information. In the determination set table, collation parameters used in a case where performing collation are set for each combination of the registration device information, the material information, and the collation device information.

Here, the collation parameter is threshold information for determining whether or not an object to be determined is identical to an object from which reference data is acquired during collation. Specifically, the threshold information is either or both of a threshold value of a correlation coefficient (similarity) for determining whether or not the object to be determined is identical to the object from which the reference data is acquired and a threshold value of a normalized score which is a value obtained by normalizing the correlation coefficient.

Here, which threshold value is used to perform collation to increase the accuracy of the collation is obtained in advance for each combination of a registration device, a material of an object to be determined, and a collation device. The collation parameters obtained in this manner are stored in the determination set table storage unit 35 as the determination set table.

In the determination set table illustrated in FIG. 4, a threshold value of a correlation coefficient (similarity) and a threshold value of a normalized score of the correlation coefficient are respectively set to "0.34" and "8" as optimal collation parameters in a case of performing collation for a combination of registration device information "scan001", material information "plain paper", and collation device information "phone001".

The random pattern table storage unit 34 stores a random pattern table in which registration device information, material information, and reference data acquired in advance are stored in association with each other.

An example of the random pattern table stored in the random pattern table storage unit 34 is illustrated in FIG. 5.

In the random pattern table illustrated in FIG. 5, for example, a random pattern "0x83a53159 . . . " acquired from a reference object surface is registered as reference data in association with information indicating registration device information "scan001" and material information "plain paper".

The data transmission and reception unit 31 transmits and receives data to and from the terminal apparatus 10, the scanning apparatus 50, or the like through the network 30. The data transmission and reception unit 31 receives registration device information and material information from the scanning apparatus 50 together with reference data in a case where the reference data is registered. The data transmission and reception unit 31 receives collation data acquired from an object to be determined in a case where a determination process is performed, registration device information, material information, and collation device information.

In a case where the registration device information, the material information, and the reference data are transmitted from the scanning apparatus 50, the registration control unit 32 registers the transmitted registration device information, material information, and reference data in the random pattern table storage unit 34 in association with each other.

The collation control unit 33 reads out collation parameters corresponding to a set of the registration device information, the material information, and the collation device information received by the data transmission and reception unit 31 from the determination set table storage unit 35, and reads out reference data corresponding to the registration device information and the material information from the random pattern table storage unit 34. The collation control unit 33 determines the identity of the object to be determined by collating the collation data received by the data transmission and reception unit 31 with the reference data read out from the random pattern table storage unit 34 using the read-out collation parameters.

The collation control unit 33 returns a result of the determination of the identity to the terminal apparatus 10 having transmitted the collation data. Then, in the terminal apparatus 10, the determination result returned from the determination server 40 is displayed on a display or the like, so that a user can know an authenticity determination result for the object to be determined.

Meanwhile, in a case where there is an attempt to determine the identity of an object to be determined, the collation control unit 33 determines that a determination process is inexecutable in a case where a set of registration device information, material information, and collation device information is not registered in the determination set table storage unit 35. In this case, a user may be notified that the authenticity of an object to be determined has not been determined through a terminal apparatus. That is, in a case where the authenticity of the object to be determined has not been determined, an authenticity determination result which is a result of the determination of identity of an object by performing collation using the read-out collation parameters is notified to a user in a different form. Further, in a case where the notification is given, the user may be notified which information in the determination set has not been registered. For example, in a case where collation device information (phone100) is not registered in the determination set table, a display screen indicating that "authenticity determination cannot be performed using phone100" is displayed on a terminal apparatus.

Figure 6:
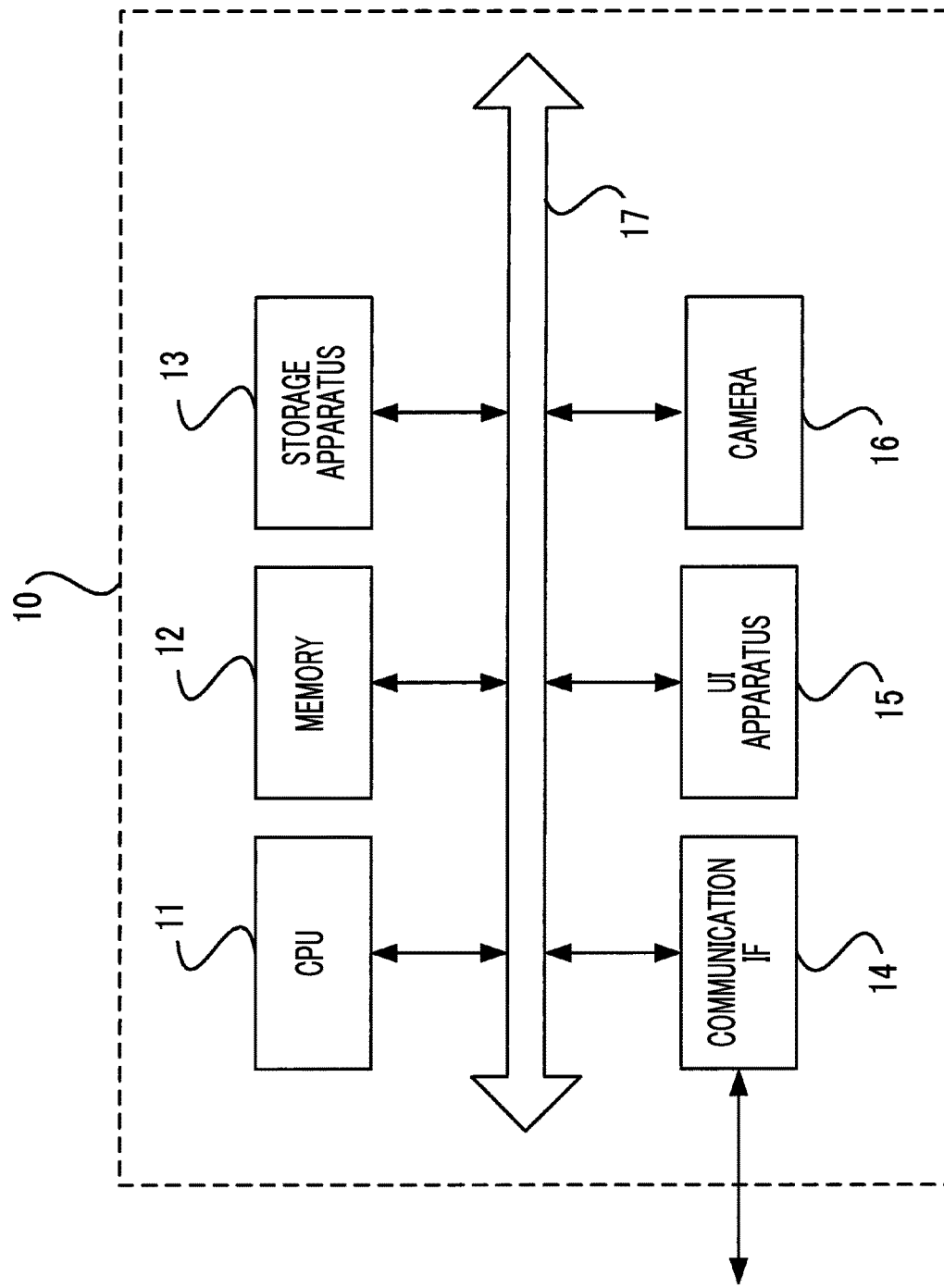
FIG. 6 is a block diagram illustrating a hardware configuration of a terminal apparatus 10 in the first exemplary embodiment of the present invention.

Next, a hardware configuration of the terminal apparatus 10 in the identity determination system according to the exemplary embodiment is illustrated in FIG. 6.

As illustrated in FIG. 6, the terminal apparatus 10 includes a CPU 11, a memory 12, a storage apparatus 13 such as a hard disk drive (HDD), a communication interface (IF) 14 transmitting and receiving data to and from an external apparatus through the network 30, a user interface (UI) apparatus 15 including a touch panel or a liquid crystal display and a keyboard, and a camera 16 for capturing an image. These components are connected to each other through a control bus 17.

The CPU 11 executes predetermined processing on the basis of a control program stored in the memory 12 or the storage apparatus 13 to control the operation of the terminal apparatus 10. Meanwhile, in the exemplary embodiment, a description has been given on the assumption that the CPU 11 reads out and executes the control program stored in the memory 12 or the storage apparatus 13, but the program can also be downloaded as an application program and provided to the CPU 11.

Figure 7:
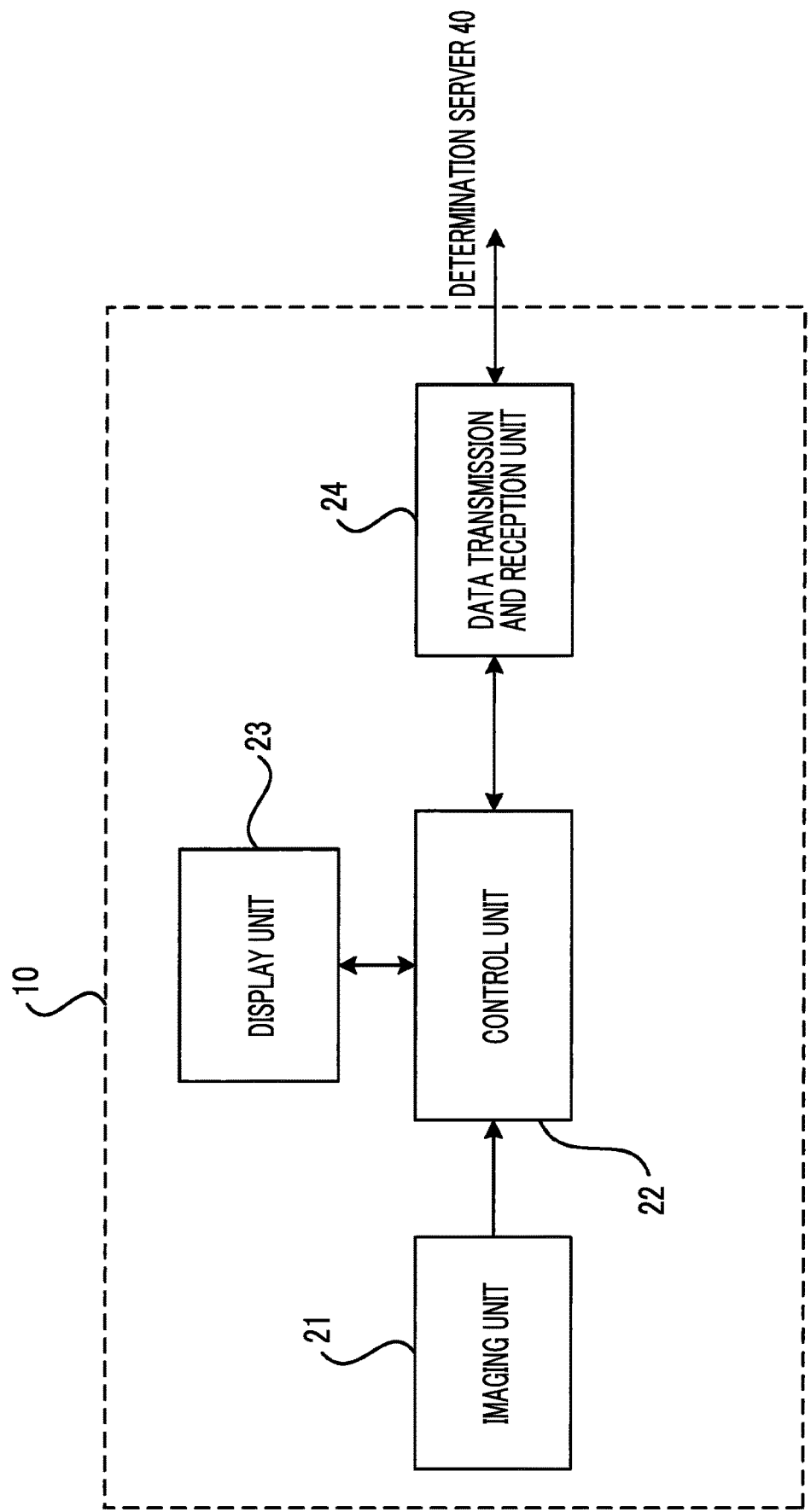
FIG. 7 is a block diagram illustrating a functional configuration of the terminal apparatus 10 in the first exemplary embodiment of the present invention.

FIG. 7 is a block diagram illustrating a functional configuration of the terminal apparatus 10 which is realized by executing the above-described control program.

As illustrated in FIG. 7, the terminal apparatus 10 according to the exemplary embodiment includes an imaging unit 21, a control unit 22, a display unit 23, and a data transmission and reception unit 24.

The imaging unit 21 images an object to be determined to acquire image data. The data transmission and reception unit 24 transmits and receives data to and from the determination server 40 through the wireless LAN terminal 20 and the network 30.

The control unit 22 acquires collation data of a specific region of the object to be determined from the image of the object to be determined which is captured by the imaging unit 21.

Here, in the exemplary embodiment, registration device information and material information are printed on the surface of an object to be determined by a two-dimensional code such as a coded QR code (registered trademark). For this reason, the control unit 22 extracts the two-dimensional code from the image of the object to be determined which is captured by the imaging unit 21 to acquire registration device information and material information.

The control unit 22 transmits the registration device information and the material information from the data transmission and reception unit 24 to the determination server 40 together with the acquired collation data.

The display unit 23 displays a determination result transmitted from the determination server 40 on the basis of the control of the control unit 22.

With such a configuration, the terminal apparatus 10 images a portion of the surface of an object to be determined to acquire collation data, registration device information, and material information, and transmits the acquired collation data, registration device information, and material information to the determination server 40 together with collation device information which is information regarding a host apparatus.

Next, operations in the identity determination system according to the exemplary embodiment will be described in detail with reference to the accompanying drawings.

First, processing in a case where reference data is registered will be described with reference to FIG. 8.

Figure 8:
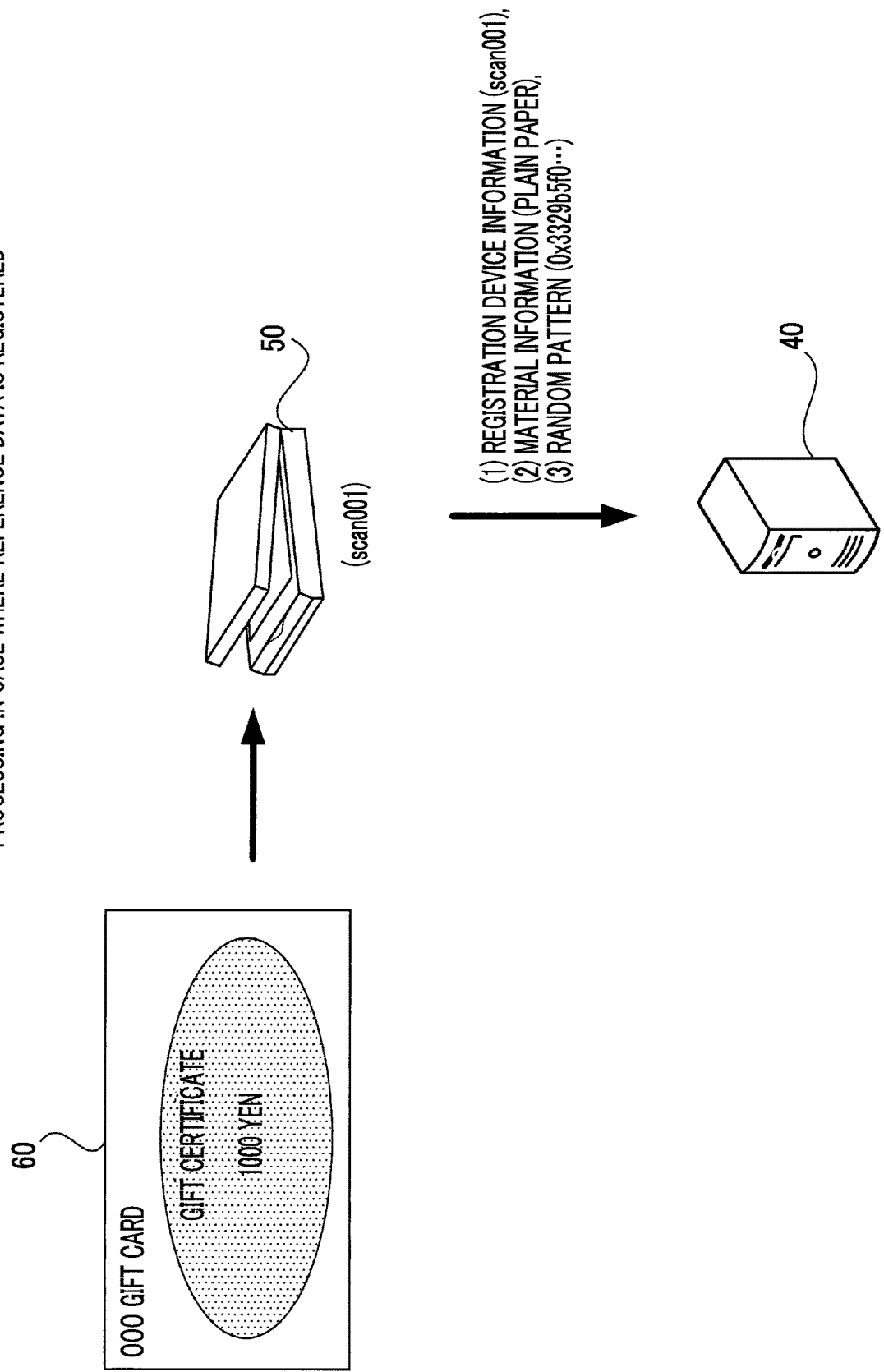
FIG. 8 is a diagram illustrating processing in a case where reference data is registered.

Hereinafter, a specific description will be given using a case where a gift certificate 60 as illustrated in FIG. 8 is set to be an object to be determined. In FIG. 8, an operation of acquiring reference data from the gift certificate 60 and registering the acquired reference data in the determination server 40 is illustrated.

Figure 9:
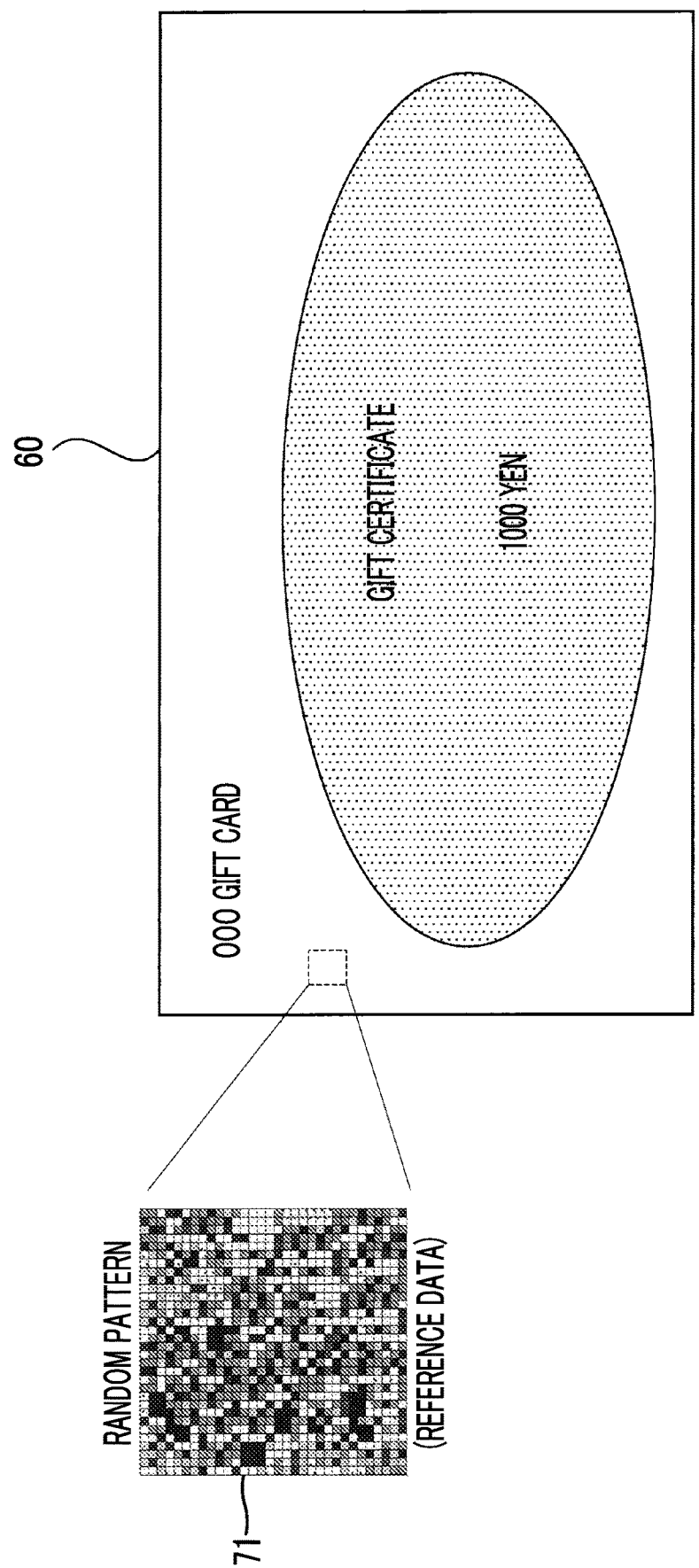
FIG. 9 is a diagram illustrating a state where a random pattern 71 is acquired from a specific region in a gift certificate 60 as reference data.

As illustrated in FIG. 8, the gift certificate 60 is scanned by the scanning apparatus 50 to read an image. Then, as illustrated in FIG. 9, a random pattern 71 of a specific region of the gift certificate 60, for example, a region of 1 mm to 2 mm square is acquired as reference data.

(1) registration device information "scan001" such as an apparatus type name of the scanning apparatus 50, (2) material information "plain paper" which is a material of the gift certificate 60 which is input by a user or the like, and (3) information regarding the acquired random pattern 71 are transmitted from the scanning apparatus 50 to the determination server 40.

In the determination server 40, the registration device information and the material information which are transmitted from the scanning apparatus 50, and the random pattern which is reference data are registered in the random pattern table storage unit 34 in association with each other by the registration control unit 32.

Figure 10:
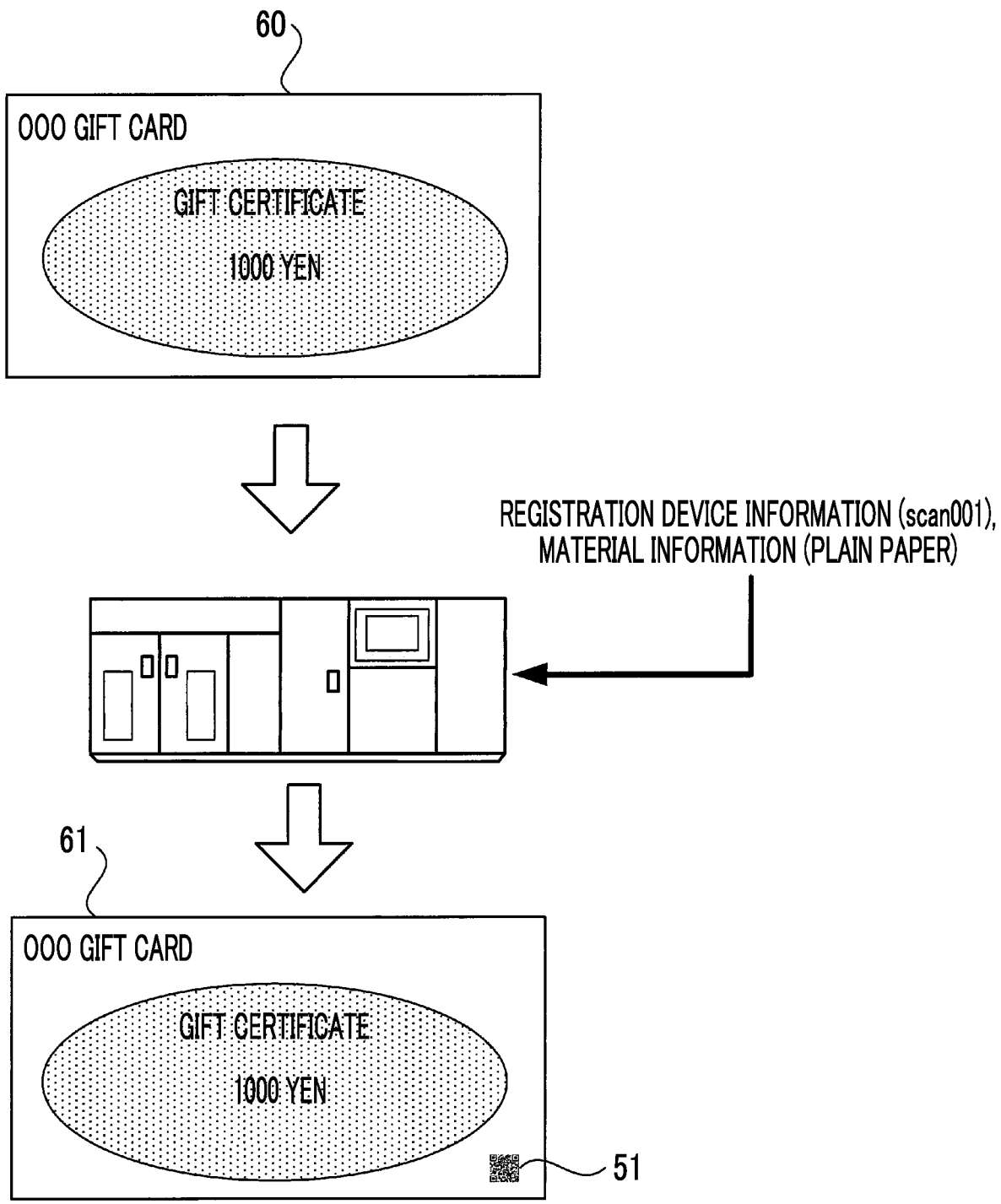
FIG. 10 is a diagram illustrating a state where a two-dimensional code 51 obtained by coding registration device information and material information is printed on the gift certificate 60.

Thereafter, as illustrated in FIG. 10, a two-dimensional code 51 obtained by coding the registration device information "scan001" and the material information "plain paper" is printed by a printer at a specific location on the gift certificate 60 on which the random pattern is registered. In this manner, the gift certificate 61 having the two-dimensional code 51 printed thereon is distributed to the market. Meanwhile, in the exemplary embodiment, a description is given using a case where printing is performed by coding registration device information and material information, but a character string or the like may be simply printed on the surface of an object to be determined.

Next, processing in a case where identity determination is performed will be described with reference to FIG. 11.

A description will be given of a case where the gift certificate 61 having the two-dimensional code 51 printed thereon is acquired, and authenticity determination for determining whether the gift certificate 61 is regularly issued or is illegally reproduced by copying or the like.

Figure 12:
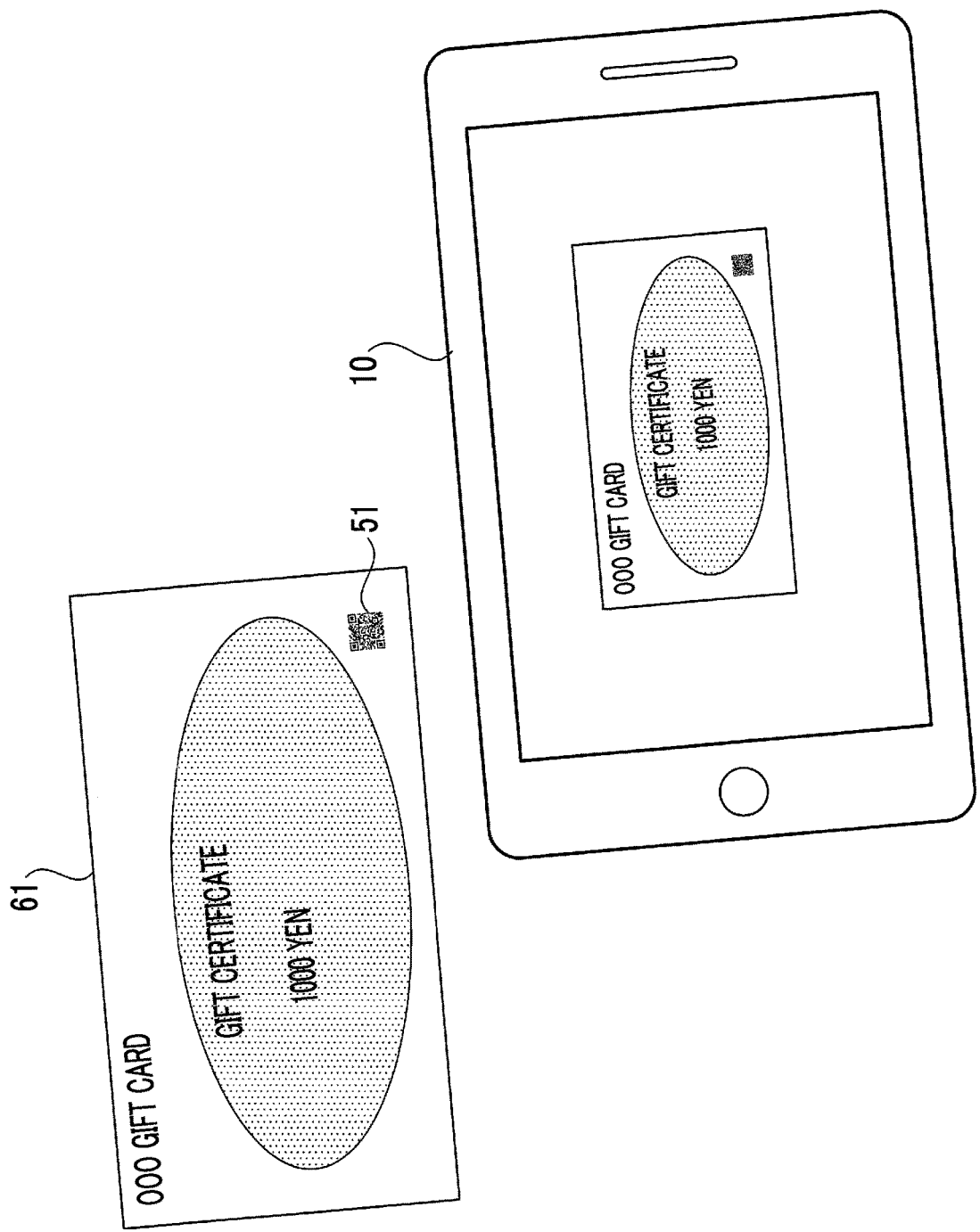
FIG. 12 is a diagram illustrating a state where a gift certificate 61 is imaged by an imaging unit 21 of the terminal apparatus 10.
Figure 13:
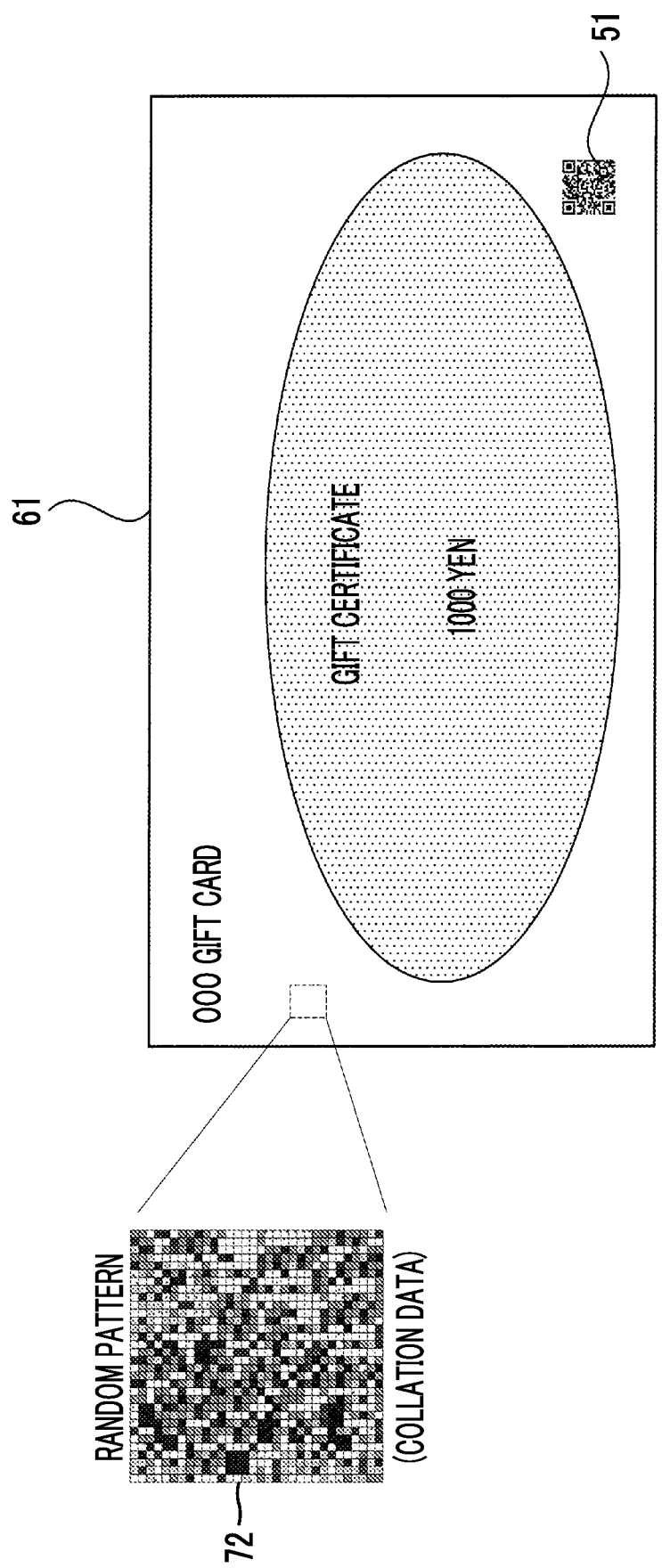
FIG. 13 is a diagram illustrating a state where a random pattern 72 is acquired from a specific region in an image of the imaged gift certificate 61 as collation data.

First, as illustrated in FIG. 12, the gift certificate 61 is imaged by the imaging unit 21 of the terminal apparatus 10. Then, in the terminal apparatus 10, a random pattern 72 is acquired as collation data from a specific region of the captured image of the gift certificate 61, as illustrated in FIG. 13. In addition, the terminal apparatus 10 decodes the two-dimensional code 51 included in the captured image of the gift certificate 61 to acquire registration device information "scan001" and material information "plain paper".

Figure 11:
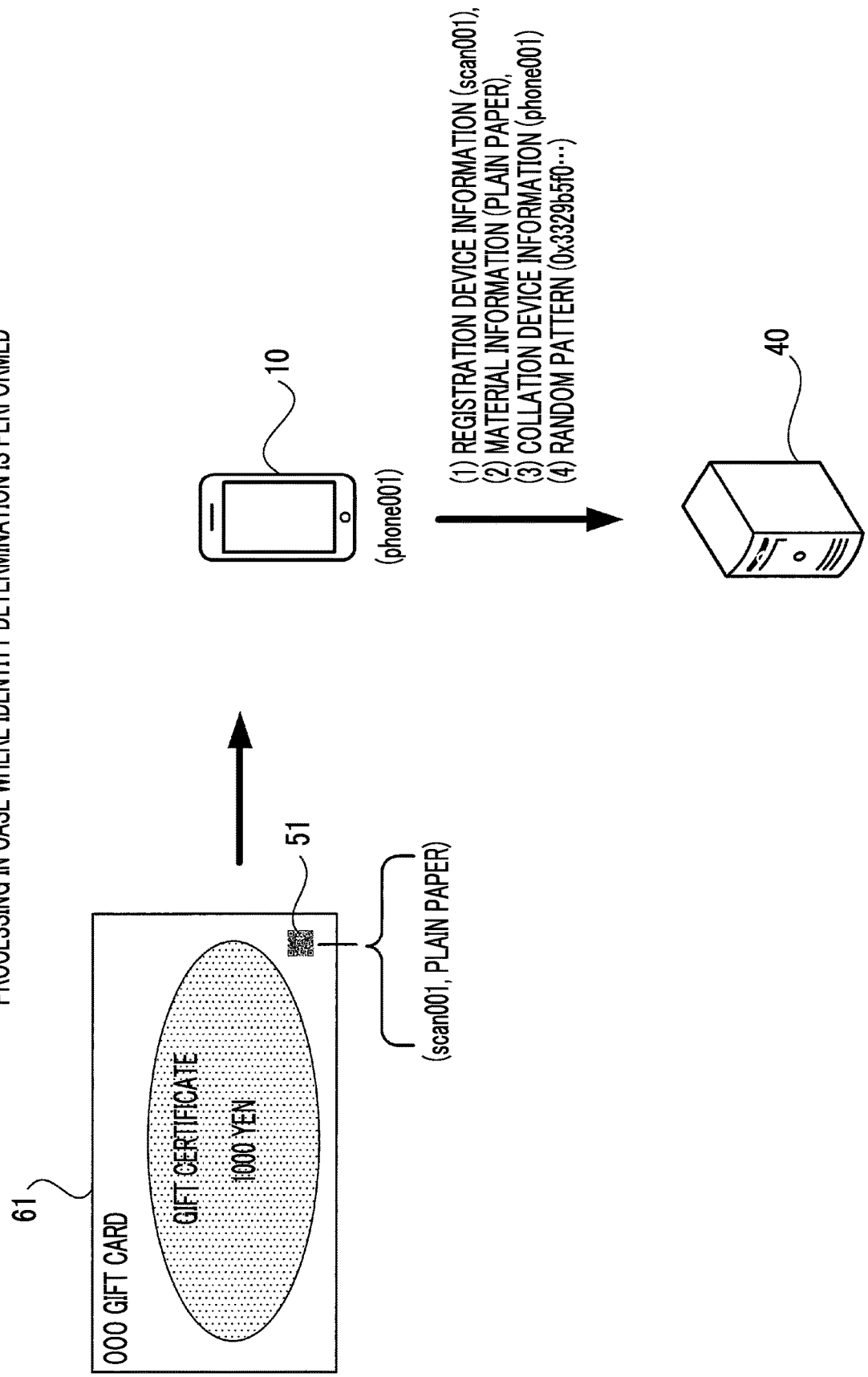
FIG. 11 is a diagram illustrating processing in a case where identity determination is performed.

As illustrated in FIG. 11, (1) registration device information "scan001", (2) material information "plain paper", (3) collation device information (phone001) which is information such as an apparatus type name of a host apparatus, and (4) information regarding the random pattern 72 which is acquired as collation data are transmitted from the terminal apparatus 10 to the determination server 40. Meanwhile, in the exemplary embodiment, the registration device information "scan001" is transmitted. However, for example, in a case where it is ascertained that registration device information related to collation device information "phone001" is "scan001", the registration device information does not need to be necessarily transmitted "phone001". For example, only the material information (plain paper) and the collation device information (phone001) which is information such as an apparatus type name of a host apparatus may be transmitted from the terminal apparatus 10 to the determination server 40.

Then, the collation control unit 33 of the determination server 40 acquires all random patterns associated with the transmitted registration device information "scan001" and material information "plain paper" as reference data from the random pattern table stored in the random pattern table storage unit 34.

Further, the collation control unit 33 acquires collation parameters associated with the transmitted registration device information "scan001", material information "plain paper", and collation device information "phone001" from the determination set table stored in the determination set table storage unit 35. Specifically, the collation control unit 33 acquires information such as a threshold value of a correlation coefficient "0.34" and a threshold value of a normalized score "8" as collation parameters from the determination set table.

Meanwhile, in a case where registration device information is not transmitted from the terminal apparatus 10, collation parameters may be acquired using collation device information. For example, in a case where it is ascertained that registration device information related to the collation device information "phone001" is "scan001", the registration device information "scan001" may be specified using the collation device information "phone01" transmitted from the terminal apparatus 10, and collation parameters associated with the specified registration device information "scan001", the material information "plain paper", and the collation device information "phone001" may be acquired.

Figure 14:
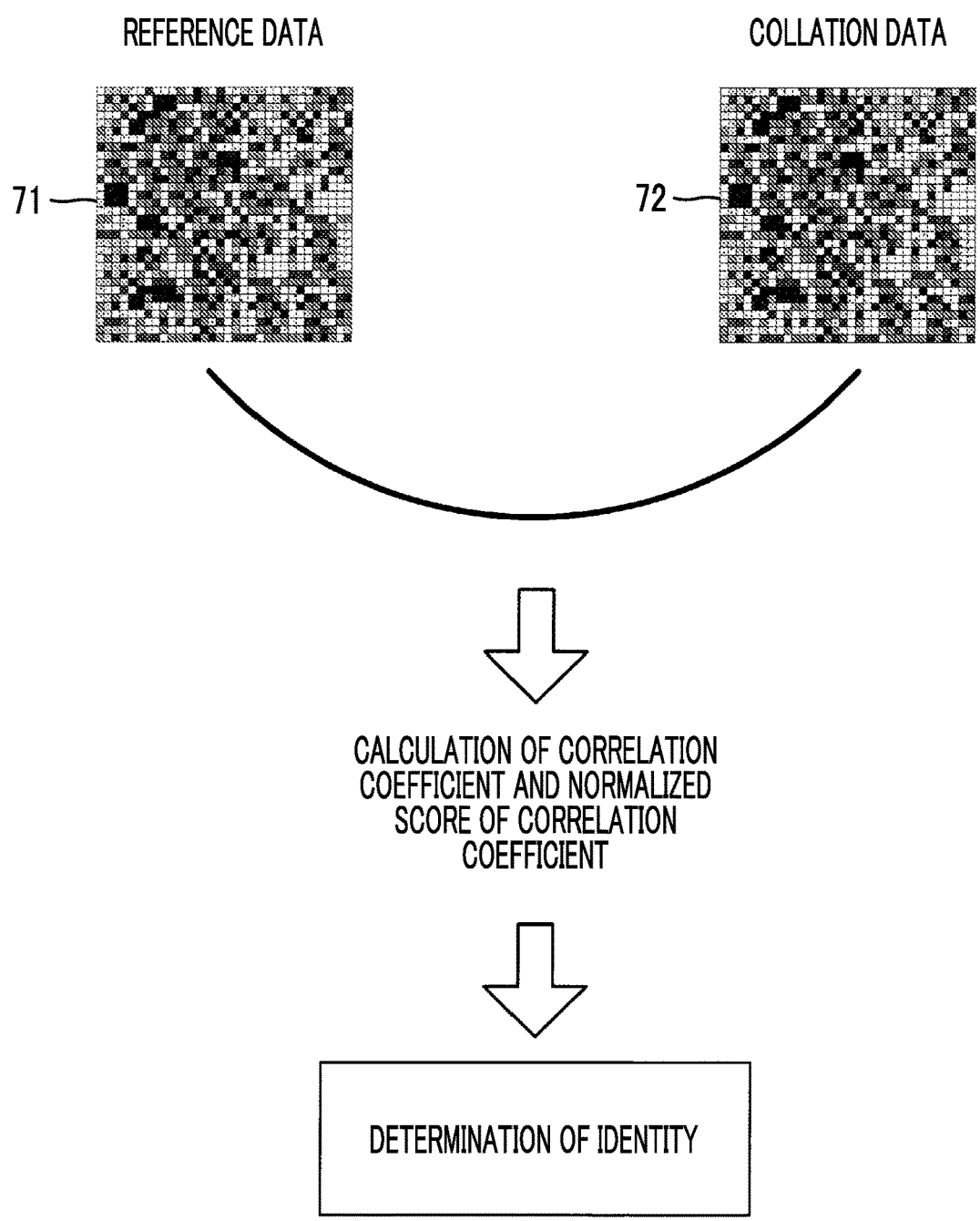
FIG. 14 is a diagram illustrating a state where a collation control unit 33 performs correlation computation between the random pattern 71 acquired as reference data and the random pattern 72 acquired as collation data to perform identity determination.

As illustrated in FIG. 14, the collation control unit 33 performs correlation computation of a concentration value for each pixel of each of the random pattern 71 acquired as reference data and the random pattern 72 acquired as collation data to calculate a correlation coefficient (correlation value). The collation control unit 33 determines whether or not two objects for comparison are identical to each other according to whether or not the calculated correlation coefficient is equal to or greater than a threshold value "0.34".

Meanwhile, the collation control unit 33 performs not only identity determination by comparing the correlation coefficient with the threshold value but also identity determination by calculating a normalized score and comparing the calculated normalized score with the threshold value.

Specifically, since it is practically difficult to acquire both the reference data and the collation data from the same position, a region for acquiring the collation data is set wider than a region for acquiring the reference data.

For this reason, correlation computation between the reference data and the collation data is practically performed a plurality of times while shifting pixels. Identity determination is performed by comparing a maximum value of a correlation coefficient calculated through the plurality of times of correlation computation with the above-described threshold value. Further, the determination of identity is performed by computing a normalized score in the maximum value of the correlation coefficient from the maximum value of the correlation coefficient and an average value of a plurality of correlation coefficients.

The normalized score is a feature amount representing a distribution state of the maximum value of the correlation coefficient, and the normalized score of the maximum value of the correlation coefficient is calculated on the basis of the following expression.

> Normalized score=(maximum value of correlation coefficient−average value of correlation coefficients)÷standard deviation of correlation coefficient The normalized score is an index indicating how far the value thereof is away from an average value of a population. For this reason, the normalized score of the maximum value of the correlation value is an index indicating how far a maximum value among a plurality of correlation values is away from an average value of the correlation values.

The collation control unit 33 compares each of the maximum value of the correlation coefficient and the normalized score of the maximum value of the correlation coefficient with the threshold value acquired as a collation parameter to perform final identity determination.

A determination result of the identity determination in the determination server 40 is transmitted to the terminal apparatus 10 and is displayed on the terminal apparatus 10.

Figure 15:
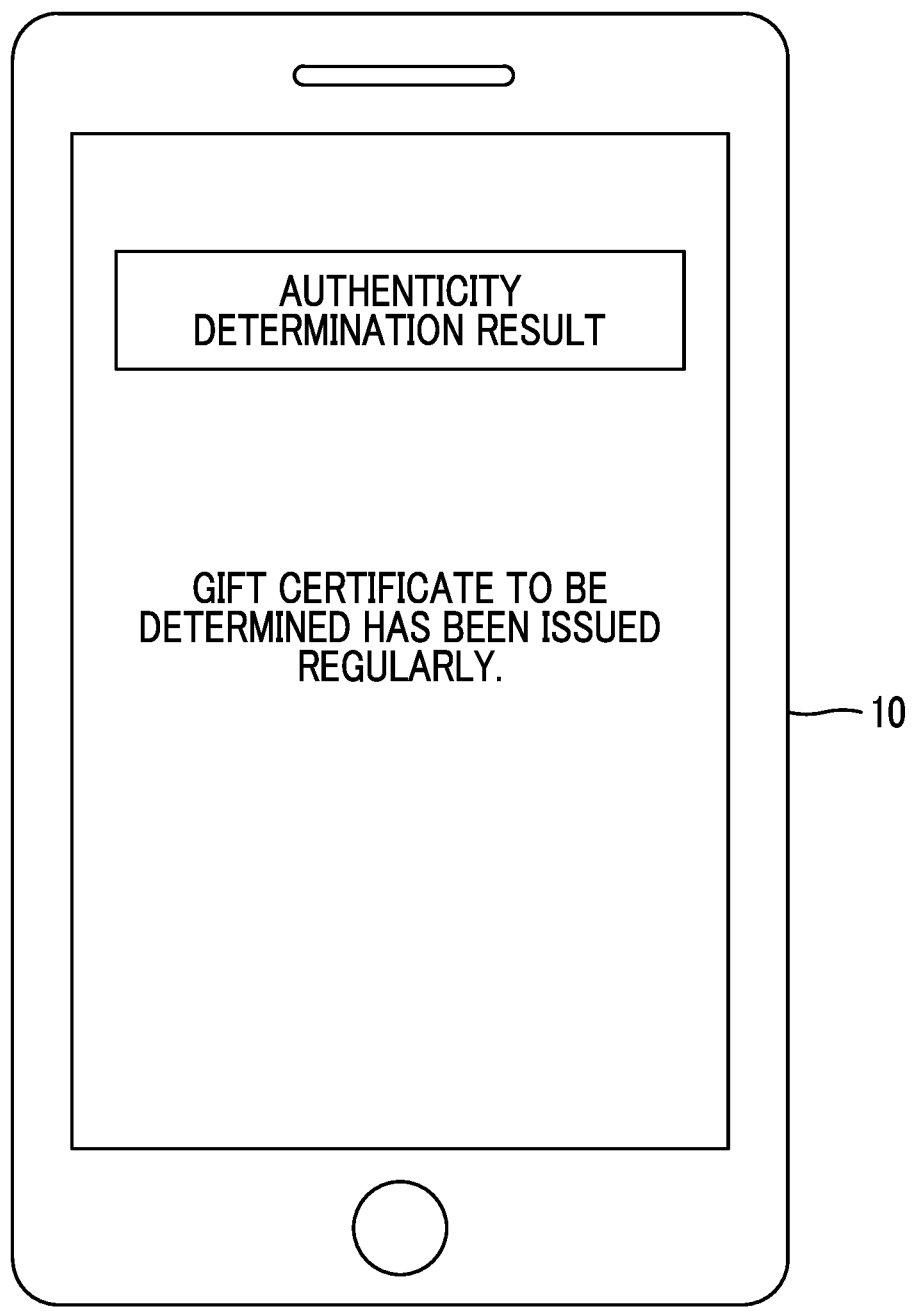
FIG. 15 is a diagram illustrating a display example 1 of a determination result displayed on the terminal apparatus 10.
Figure 16:
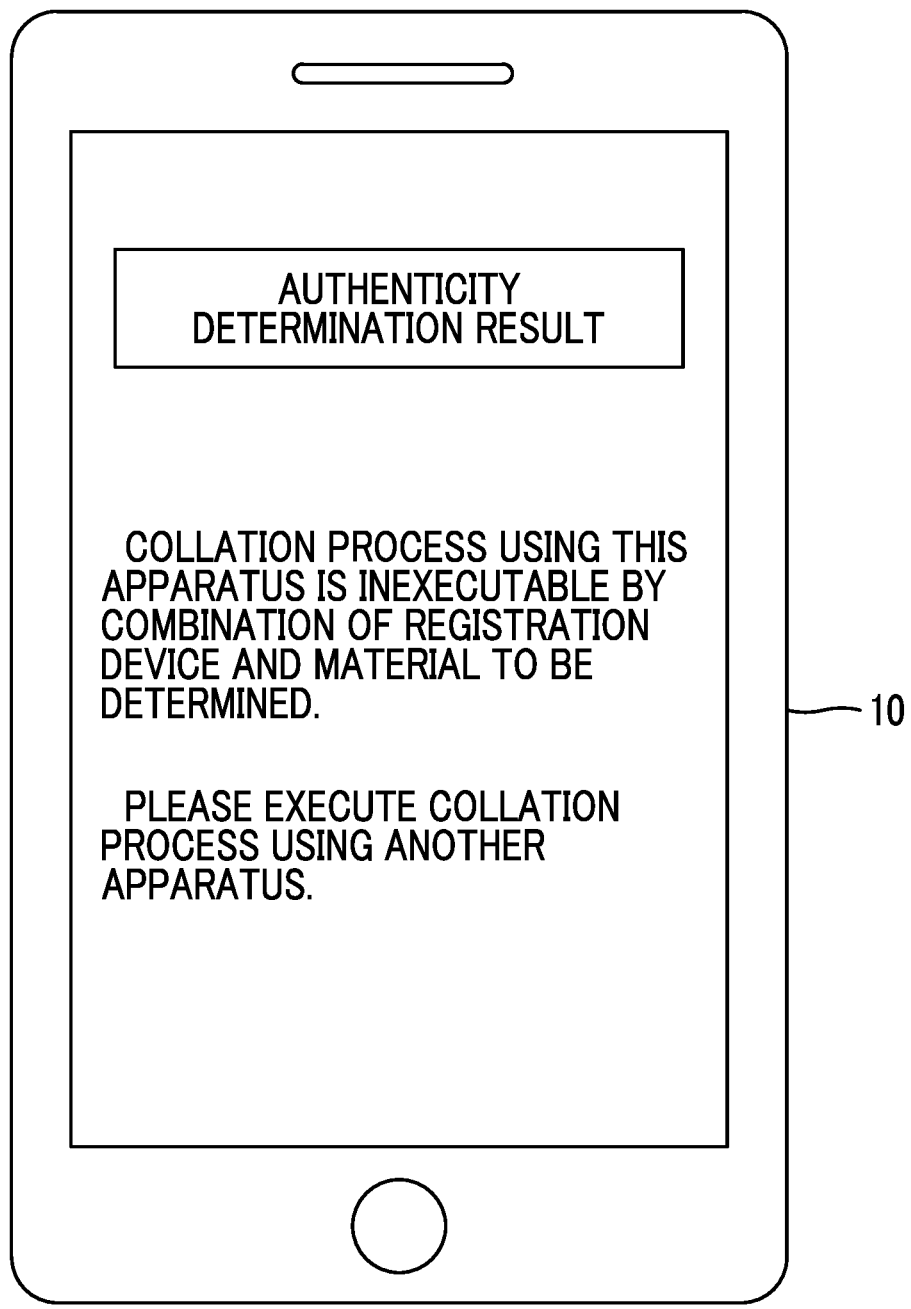
FIG. 16 is a diagram illustrating a display example 2 of a determination result displayed on the terminal apparatus 10.

In this manner, a display example in a case where a determination result is displayed on the terminal apparatus 10 is illustrated in FIGS. 15 and 16.

FIG. 15 illustrates a display example of a determination result in a case where it is determined that both collation data and reference data are acquired by the identical object in the determination server 40. That is, in FIG. 15, texts of "A gift certificate to be determined has been issued regularly." are displayed on the terminal apparatus 10 as an authenticity determination result of the gift certificate 61, and a user can know that the gift certificate 61 determined has been issued regularly.

In addition, FIG. 16 illustrates a display example on the terminal apparatus 10 in a case where it is determined that a determination process is inexecutable due to a set of registration device information, material information, and collation device information not being registered in the determination set table storage unit 35.

Referring to FIG. 16, texts of "A collation process using this apparatus is inexecutable by a combination of a registration device and a material to be determined. "Please execute the collation process using another apparatus." are displayed on the terminal apparatus 10 as an authenticity determination result. That is, the accuracy of collation is not secured in the collation process using the terminal apparatus 10, and thus display for prompting a user to perform a collation process may be performed by an apparatus other than the terminal apparatus 10.

Second Exemplary Embodiment

Next, an identity determination system according to a second exemplary embodiment of the present invention will be described.

The identity determination system according to the exemplary embodiment has substantially the same configuration as that of the identity determination system according to the first exemplary embodiment described above, and only differences therebetween will be described. For this reason, in the exemplary embodiment, a description will be given by denoting the same components as those in the first exemplary embodiment by the same reference numerals and signs.

In the exemplary embodiment, a random pattern table stored in a random pattern table storage unit 34 of a determination server 40 is configured as illustrated in FIG. 17.

That is, the random pattern table storage unit 34 in the exemplary embodiment stores registration device information, material information, an identification identifier (ID) which is identification information regarding an object, and reference data acquired in advance in association with each other.

Figure 18:
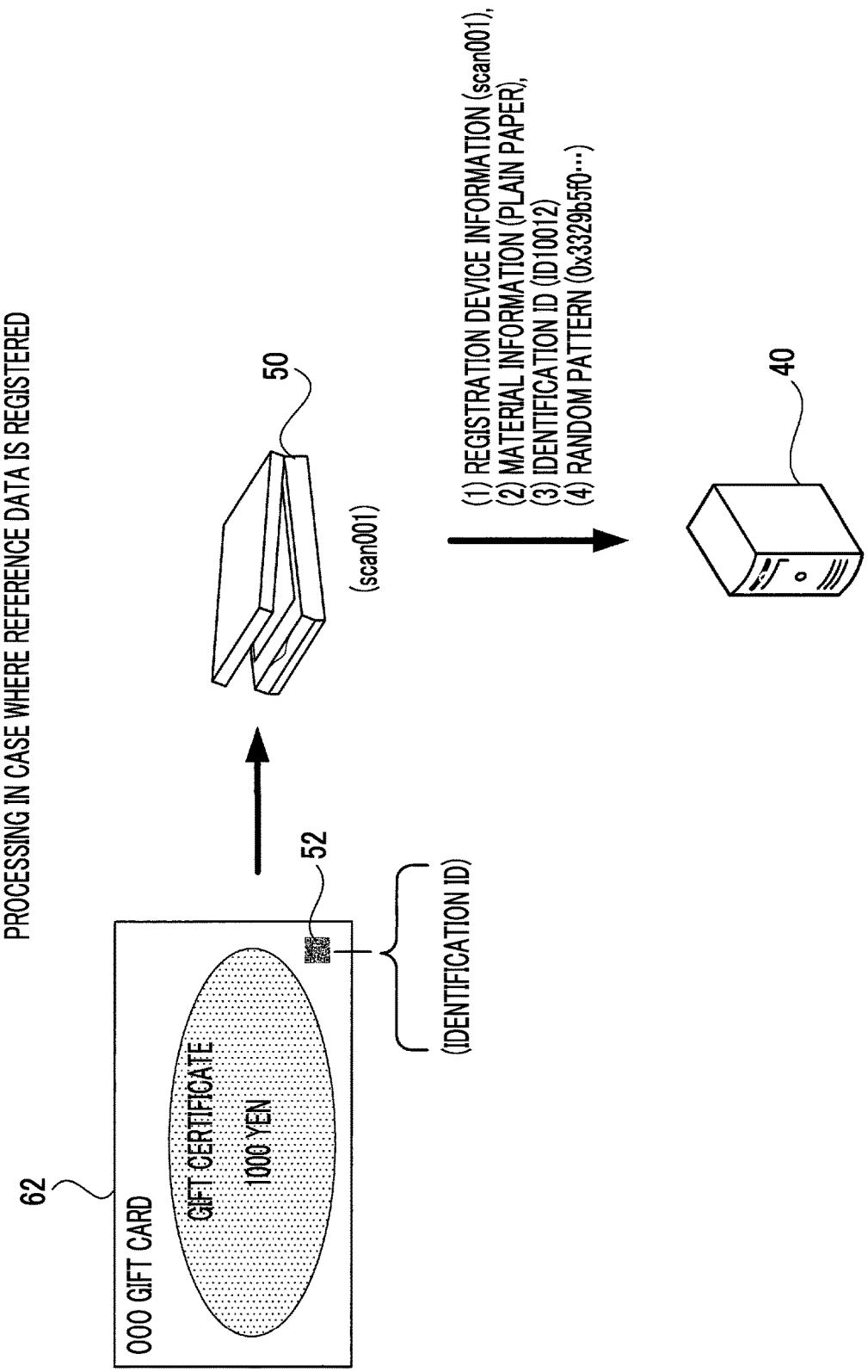
FIG. 18 is a diagram illustrating processing in a case where reference data is registered in an identity determination system according to the second exemplary embodiment of the present invention.

In the exemplary embodiment, as illustrated in FIG. 18, it is premised that an identification ID for identifying the individual of a gift certificate 62 which is an object to be determined is coded and printed as a two-dimensional code 52 on the gift certificate 62.

Meanwhile, in the exemplary embodiment, a description is given using a case where an identification ID is printed as the two-dimensional code 52 on the gift certificate 62. However, in a case where an issuance number or the like is printed for each gift certificate, it is also possible to use information such as the issuance number as an identification ID.

Meanwhile, in the exemplary embodiment, a determination set table stored in a determination set table storage unit 35 of the determination server 40 is configured similar to the determination set table in the first exemplary embodiment illustrated in FIG. 4.

In the exemplary embodiment, as illustrated in FIG. 18, (1) registration device information "scan001", (2) material information "plain paper", (3) an identification ID "ID10012" obtained from the two-dimensional code 52, and (4) information regarding an acquired random pattern 71 are transmitted from a scanning apparatus 50 to the determination server 40 in a case where reference data is registered.

Then, in the determination server 40, the registration device information transmitted from the scanning apparatus 50, the material information, the identification ID, and the random pattern which is reference data are registered in the random pattern table storage unit 34 in association with each other by a registration control unit 32.

Next, processing in a case where identity determination is performed in the identity determination system according to the exemplary embodiment will be described with reference to FIG. 19.

Also in the exemplary embodiment, the gift certificate 62 to be determined is imaged by an imaging unit 21 of a terminal apparatus 10. Then, in the terminal apparatus 10, a random pattern is acquired as collation data from a specific region of a captured image of the gift certificate 62. In addition, the terminal apparatus 10 decodes a two-dimensional code 52 included in the captured image of the gift certificate 62 to acquire an identification ID "ID10012".

The terminal apparatus 10 in the exemplary embodiment images a portion of the surface of an object to be determined to acquire collation data and an identification ID of the object, and transmits the acquired collation data and identification ID to the determination server 40 together with collation device information which is information regarding a host apparatus.

Figure 19:
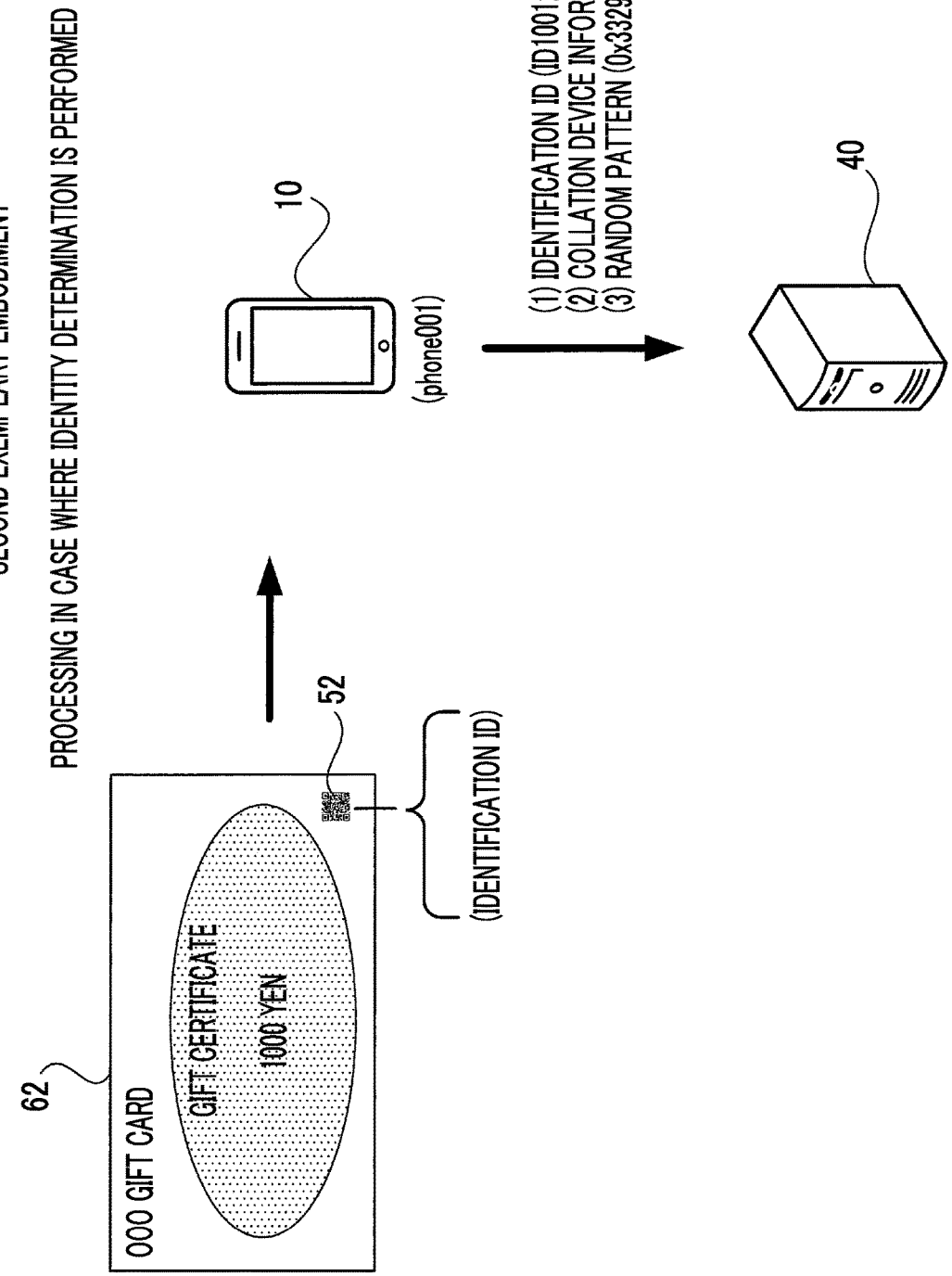
FIG. 19 is a diagram illustrating processing in a case where identity determination is performed in the identity determination system according to the second exemplary embodiment of the present invention.

Specifically, as illustrated in FIG. 19, (1) an identification ID, (2) collation device information (phone001) which is information such as an apparatus type name of the host apparatus, and (3) information regarding a random pattern acquired as collation data are transmitted from the terminal apparatus 10 to the determination server 40.

Then, a data transmission and reception unit 31 of the determination server 40 receives the collation data acquired from the object to be determined in a case where the determination process is performed, the collation device information, and the identification ID.

A collation control unit 33 of the determination server 40 acquires registration device information "scan001" and material information "plain paper" which are associated with the identification ID "ID10012" received by the data transmission and reception unit 31 from the random pattern table stored in the random pattern table storage unit 34, and reads out a random pattern associated with the identification ID "ID10012" as reference data.

Further, the collation control unit 33 reads out collation parameters corresponding to a set of the registration device information "scan001" and the material information "plain paper" which are readout from the random pattern table and the collation device information "phone001" received by the data transmission and reception unit 31 from the determination set table storage unit 35.

The collation control unit 33 collates the collation data received by the data transmission and reception unit 31 with the reference data read out from the random pattern table storage unit 34 using the read-out collation parameters to determine the identity of the object to be determined.

In the exemplary embodiment, only one piece of reference data to be compared with collation data during collation is specified by an identification ID. For this reason, the collation control unit 33 may perform collation between the collation data and the reference data with a pair of pieces of data.

Meanwhile, the collation between the reference data and the collation data in the exemplary embodiment is the same as that in the first exemplary embodiment described above, and thus a description thereof will be omitted.

Third Exemplary Embodiment

Next, an identity determination system according to a third exemplary embodiment of the present invention will be described.

The identity determination system according to the exemplary embodiment has substantially the same configuration as those of the identity determination systems according to the first and second exemplary embodiments described above, and only differences will be described. For this reason, in the exemplary embodiment, a description will be given by denoting the same components as those in the first and second exemplary embodiments by the same reference numerals and signs.

The identity determination system according to the exemplary embodiment is configured such that a determination server 40 is replaced with a determination server 40a, as compared with the identity determination systems according to the first and second exemplary embodiments described above.

Figure 20:
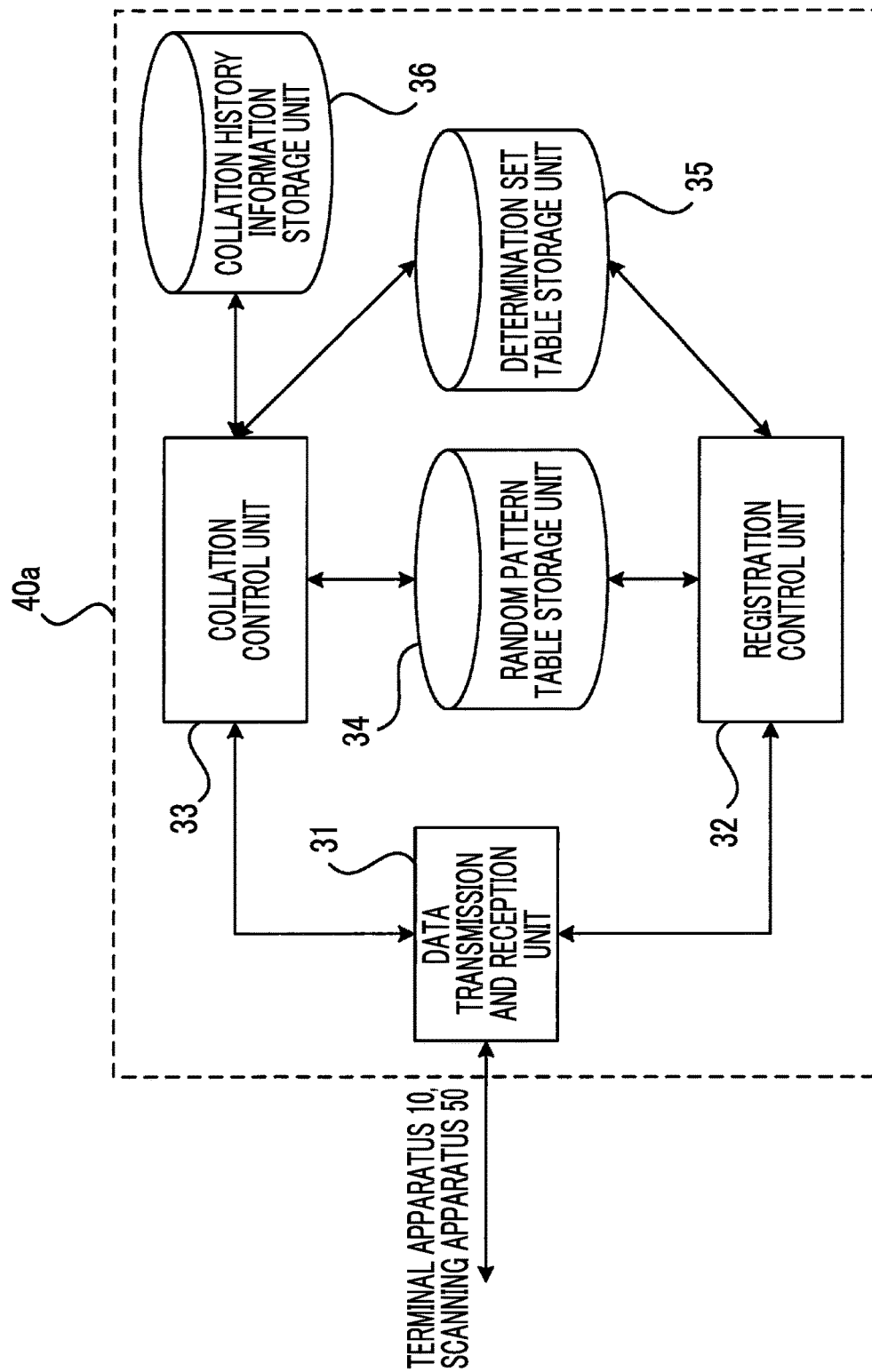
FIG. 20 is a block diagram illustrating a functional configuration of a determination server 40a in a third exemplary embodiment of the present invention.

As illustrated in FIG. 20, the determination server 40a in the identity determination system according to the exemplary embodiment is configured such that a collation history information storage unit 36 is added, as compared to the determination server 40 illustrated in FIG. 3.

An example of collation history information stored in the collation history information storage unit 36 is illustrated in FIG. 21.

The collation history information storage unit 36 stores collation data received by a data transmission and reception unit 31 in a case where collation is performed in the past, registration device information, material information, and collation device information in association with each other. That is, the collation history information storage unit 36 stores history information of the collation performed in the past.

In the exemplary embodiment, in a case where only collation data is received by the data transmission and reception unit 31 during identity determination, a collation control unit 33 calculates feature information regarding the past collation data stored in the collation history information storage unit 36. The collation control unit 33 reads out registration device information, material information, and collation device information which are stored in association with collation data from which feature information which is the most similar to the feature information calculated from the collation data received by the data transmission and reception unit 31 is calculated, from the collation history information storage unit 36. The collation control unit 33 estimates the read-out registration device information, material information, and collation device information to be registration device information, material information, and collation device information which correspond to the collation data received by the data transmission and reception unit 31.

The collation control unit 33 performs collation between the collation data and reference data using the estimated registration device information, material information, and collation device information.

Here, in the exemplary embodiment, a description will be given of a case where a luminance average value and a luminance variance of pixels of collation data are used as feature information of the collation data.

That is, as illustrated in FIG. 22, the collation control unit 33 calculates a luminance average value and a luminance variance of pixels of collation data on which collation is performed in the past, for each combination of registration device information, material information, and collation device information.

In a case where only collation data is transmitted during identity determination, the collation control unit 33 calculates a luminance average value and a luminance variance of pixels of the transmitted collation data, and specifies a combination of registration device information, material information, and collation device information of a luminance average value and a luminance variance which are the most similar to the calculated values, that is, approximate to the calculated values.

The collation control unit 33 performs collation by estimating the specified combination of registration device information, material information, and collation device information to be registration device information, material information, and collation device information of the transmitted collation data.

Further, in a case where only reference data is transmitted from a scanning apparatus 50 during a reference data registration process, a registration control unit 32 according to the exemplary embodiment calculates feature information of other reference data already stored in a random pattern table storage unit 34. The registration control unit 32 registers registration device information and material information stored in association with reference data from which feature information which is the most similar to feature information of the transmitted reference data is calculated, in the random pattern table storage unit 34 in association with the transmitted reference data.

Here, in the exemplary embodiment, a description will be given of a case where a luminance average value and a luminance variance of pixels of reference data are used as feature information of the reference data.

That is, as illustrated in FIG. 23, the registration control unit 32 calculates a luminance average value and a luminance variance of pixels of other reference data registered in the past, for each combination of registration device information and material information.

In a case where only reference data is transmitted during the registration of the reference data, the registration control unit 32 calculates a luminance average value and a luminance variance of pixels of the transmitted reference data, and specifies a combination of registration device information and material information of a luminance average value and a luminance variance which are the most similar to the calculated values, that is, approximate to the calculated values.

The registration control unit 32 performs a registration process by estimating the specified combination of registration device information and material information to be registration device information and material information of the transmitted reference data.

Modification Example

In the above-described exemplary embodiments, a description has been given of a case where the terminal apparatus 10 is used as a collation device and the scanning apparatus 50 is used as a registration device. However, the present invention is not limited thereto, and the collation device and the registration device are not limited to such apparatuses. The present invention can also be applied to, for example, a case where an apparatus called a multi-function printer having printing, scanning, and copying functions, or various equipment, such as a digital camera, which have an imaging function or a scanning function are used as the registration device or the collation device.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An identity determination apparatus comprising:
   a memory that stores a first table and a second table,
      wherein the first table stores registration apparatus information, material information, collation apparatus information, and collation reference information of a reference object, wherein the registration apparatus information of the reference object indicates a type name of an imaging apparatus that images reference data on a portion of a surface of the reference object, wherein the material information indicates a material of the reference object, wherein the collation apparatus information indicates a type name of a host apparatus, and wherein the collation reference information indicates at least one threshold value for determining whether or not an object to be determined is identical to the reference object, and
      wherein the second table stores the registration apparatus information, the material information, and the reference data of the reference object;
   a receiver that receives collation apparatus information regarding a terminal apparatus from the terminal apparatus as well as collation data, material information, and registration apparatus information acquired from a portion of a surface of the object to be determined from the terminal apparatus in a case where a determination process is performed; and a processor that reads out the collation reference information corresponding to the material information of the object to be determined and the collation apparatus information of the objected to be determined which are received by the receiver and the registration apparatus information to be specified by the collation apparatus information of the object to be determined from the first table, reads out the reference data corresponding to the registration apparatus information to be specified by the collation apparatus information of the object to be determined and the material information of the object to be determined from the second table, and collates the collation data of the object to be determined which is received by the receiver and the reference data read out from the second table with each other using the read-out collation reference information to determine identity of the object to be determined.

2. The identity determination apparatus according to claim 1,
wherein the threshold information is either or both of a threshold value of a correlation coefficient for determining whether or not the object to be determined is identical to the object from which the reference data is acquired and a threshold value of a normalized score which is a value obtained by normalizing the correlation coefficient.

3. The identity determination apparatus according to claim 2,
wherein in a case where a set of the registration apparatus information, the material information, and the collation apparatus information is not registered in the first table in a case of attempting to determine identity of an object to be determined, the processor determines that the determination process is inexecutable.

4. The identity determination apparatus according to claim 1, wherein the memory further stores a third table, wherein:
the third table stores the collation data received by the receiver during the collation in association with the registration apparatus information, the material information, and the collation apparatus information; and
the processor further calculates each of pieces of feature information of past collation data stored in the third table in a case where only the collation data is received by the receiver during the identity determination, and reads out the registration apparatus information, the material information, and the collation apparatus information, which are stored in association with collation data from which feature information which is the most similar to the feature information calculated from the collation data received by the-receiver is calculated, from the third table to estimate the read-out registration apparatus information, material information, and collation apparatus information to be registration apparatus information, material information, and collation apparatus information which correspond to the collation data received by the receiver.

5. The identity determination apparatus according to claim 4,
wherein the feature information includes a luminance average value and a luminance variance of pixels of the collation data.

6. The identity determination apparatus according to claim 5,
wherein in a case where a set of the registration apparatus information, the material information, and the collation apparatus information is not registered in the first table in a case of attempting to determine identity of an object to be determined, the processor determines that the determination process is inexecutable.

7. The identity determination apparatus according to claim 4,
wherein in a case where a set of the registration apparatus information, the material information, and the collation apparatus information is not registered in the first table in a case of attempting to determine identity of an object to be determined, the processor determines that the determination process is inexecutable.

8. The identity determination apparatus according to claim 1,
wherein the processor further registers the registration apparatus information, the material information, and the reference data in the second table in association with each other in a case where the registration apparatus information, the material information, and the reference data are transmitted, and
wherein the processor calculates feature information of other reference data already stored in the second table in a case where only the reference data is transmitted during a reference data registration process, and registers the registration apparatus information and the material information stored in association with reference data from which feature information which is the most similar to feature information of the transmitted reference data is calculated, in the second table in association with the transmitted reference data.

9. The identity determination apparatus according to claim 8,
wherein the feature information includes a luminance average value and a luminance variance of pixels of the reference data.

10. The identity determination apparatus according to claim 9,
wherein in a case where a set of the registration apparatus information, the material information, and the collation apparatus information is not registered in the first table in a case of attempting to determine identity of an object to be determined, the processor determines that the determination process is inexecutable.

11. The identity determination apparatus according to claim 8,
wherein in a case where a set of the registration apparatus information, the material information, and the collation apparatus information is not registered in the first table in a case of attempting to determine identity of an object to be determined, the processor determines that the determination process is inexecutable.

12. The identity determination apparatus according to claim 1,
wherein in a case where a set of the registration apparatus information, the material information, and the collation apparatus information is not registered in the first table in a case of attempting to determine identity of an object to be determined, the processor determines that the determination process is inexecutable.

13. An identity determination system comprising:
an identity determination apparatus including a memory, a receiver, and a processor, wherein the memory stores a first table and a second table, wherein the first table stores registration apparatus information, material information, collation apparatus information, and collation reference information of a reference object, wherein the registration apparatus information of the reference object indicates a type name of an imaging apparatus that images reference data on a portion of a surface of the reference object, wherein the material information indicates a material of the reference object, wherein the collation apparatus information indicates a type name of a host apparatus, and wherein the collation reference information indicates at least one threshold value for determining whether or not an object to be determined is identical to the reference object, wherein the second table stores the registration apparatus information, the material information, and the reference data of the reference object, wherein the receiver receives collation apparatus information regarding a terminal apparatus from the terminal apparatus as well as collation data, material information, and registration apparatus information acquired from a portion of a surface of the object to be determined from the terminal apparatus in a case where a determination process is performed, and wherein the processor reads out the collation reference information corresponding to the material information of the object to be determined and the collation apparatus information of the object to be determined which are received by the receiver and the registration apparatus information to be specified by the collation apparatus information of the object to be determined from the first table, reads out the reference data corresponding to the registration apparatus information to be specified by the collation apparatus information of the object to be determined and the material information of the object to be determined from the second table, and collates the collation data of the object to be determined which is received by the receiver and the reference data read out from the second table with each other using the read-out collation reference information to determine identity of the object to be determined; and a terminal apparatus that acquires the collation data and the material information by imaging the portion of the surface of the object to be determined, and transmits the acquired collation data and material information of the object to be determined to the identity determination apparatus together with the collation apparatus information.

14. An identity determination system comprising:

an identity determination apparatus including a memory, a receiver, and a processor, wherein the memory stores a first table and a second table, wherein the first table stores registration apparatus information, material information, collation apparatus information, and collation reference information of a reference object, wherein the registration apparatus information of the reference object indicates a type name of an imaging apparatus that images reference data on a portion of a surface of the reference object, wherein the material information indicates a material of the reference object, wherein the collation apparatus information indicates a type name of a host apparatus, and wherein the collation reference information indicates at least one threshold value for determining whether or not an object to be determined is identical to the reference object, wherein the second table stores the registration apparatus information, the material information, the reference data, and identification information of the referenced object, wherein the receiver receives collation data, collation apparatus information, and identification information regarding the object to be determined, and wherein the processor reads out the registration apparatus information, the material information, and the reference data which correspond to the identification information received by the receiver from the second table, reads out the collation reference information corresponding to a set of the read-out registration apparatus information and material information of the object to be determined and the collation apparatus information of the object to be determined from the first table, and collates the collation data of the object to be determined which is received by the receiver and the reference data read out from the second table with each other using the read-out collation reference information to determine identity of the object to be determined; and a terminal apparatus that acquires the collation data and the identification information regarding the object to be determined by imaging the portion of the surface of the object, and transmits the acquired collation data and identification information to the identity determination apparatus together with collation apparatus information which is information regarding the terminal apparatus.

* * * * *